Feb. 21, 1933. J. C. DONNELLY 1,898,717
MACHINE FOR PACKING MATCHES
Filed April 23, 1930 25 Sheets-Sheet 1
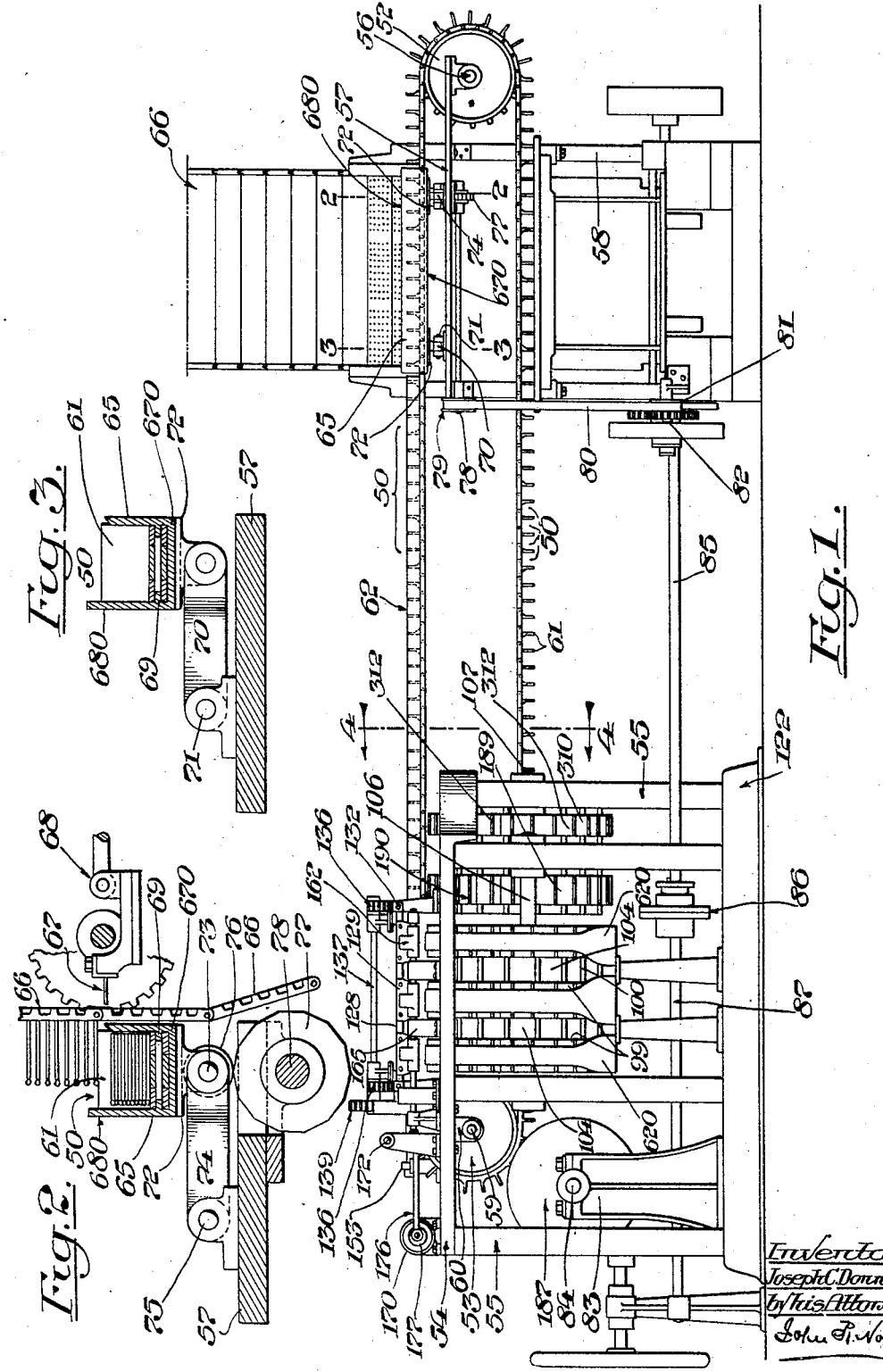

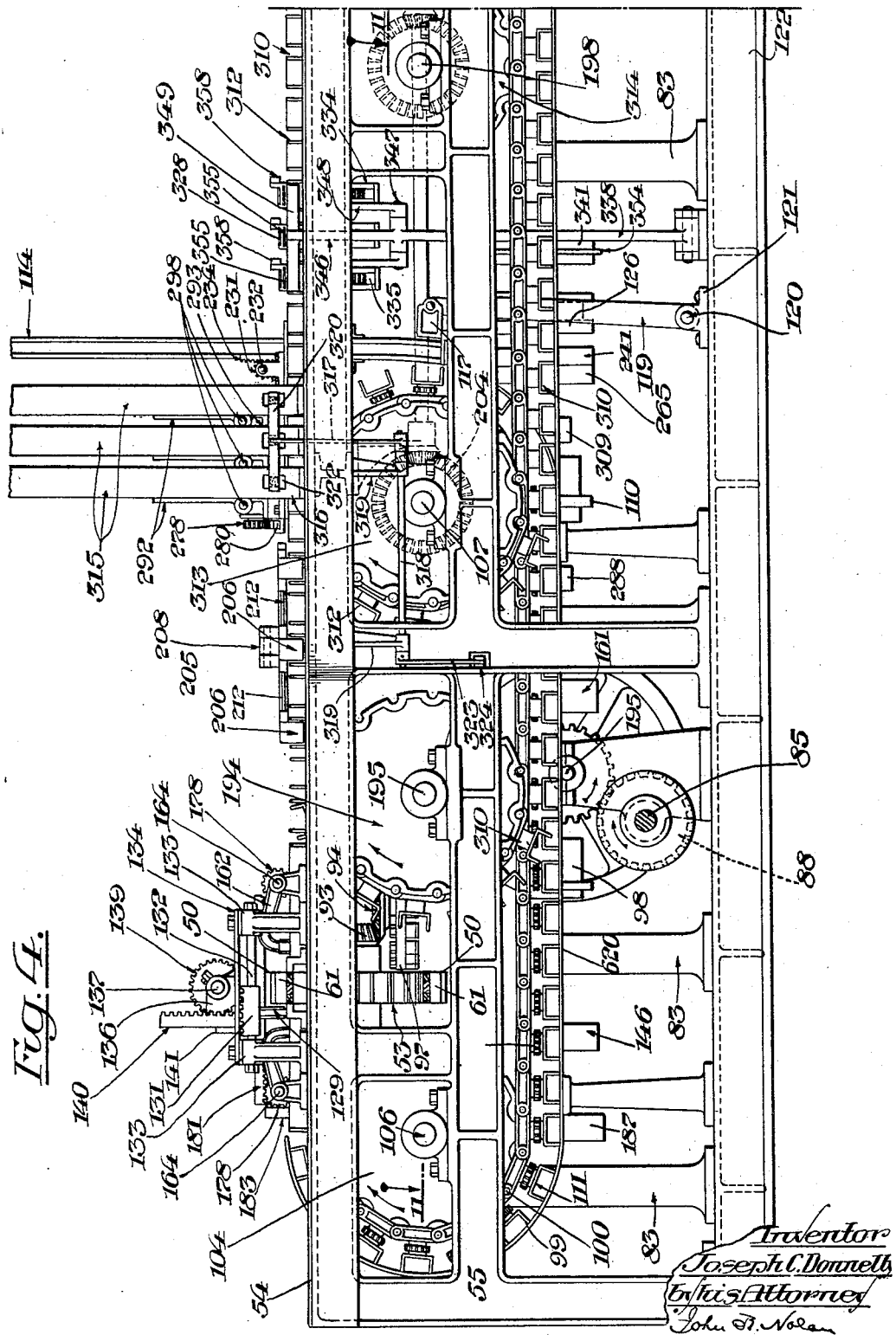

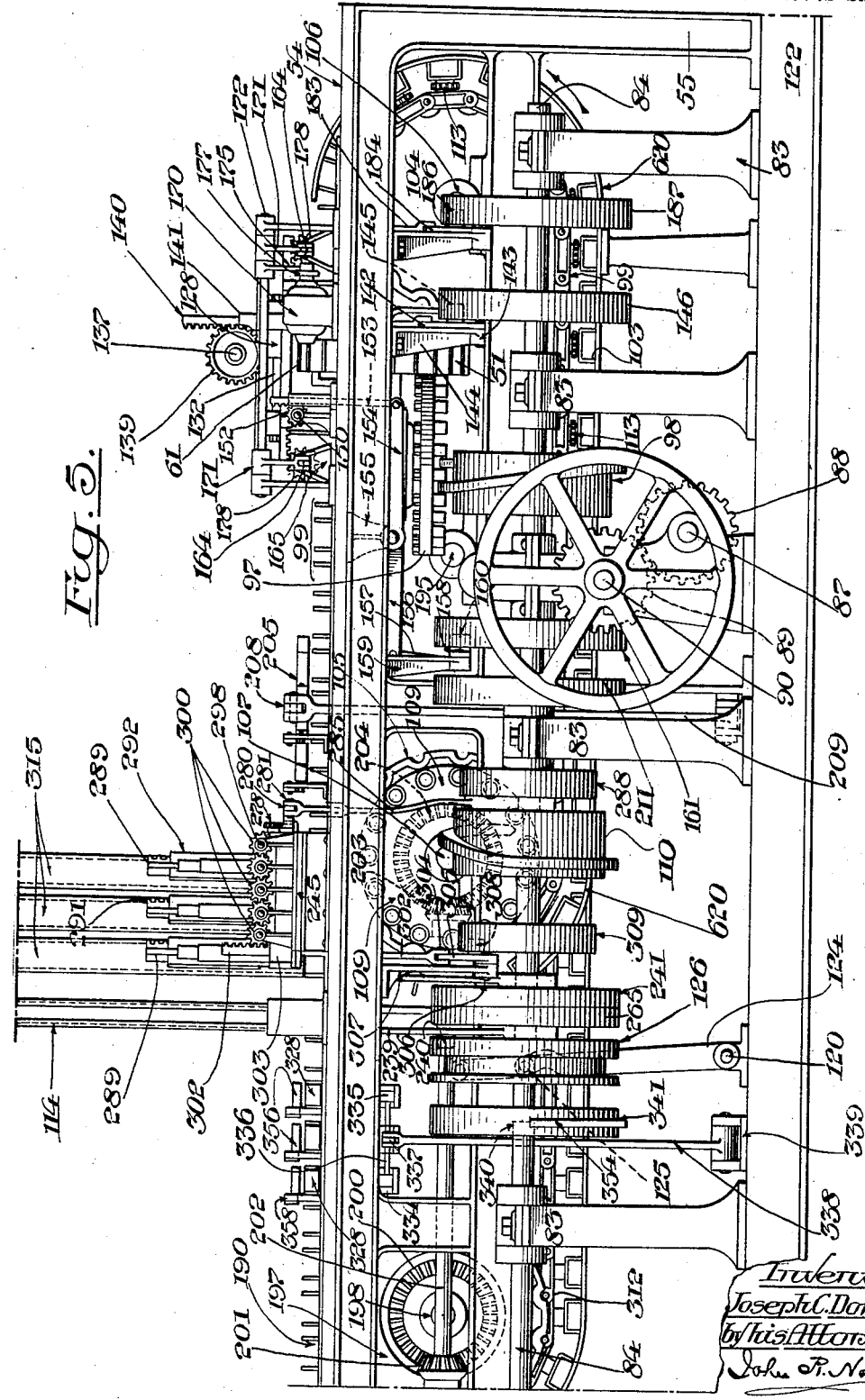

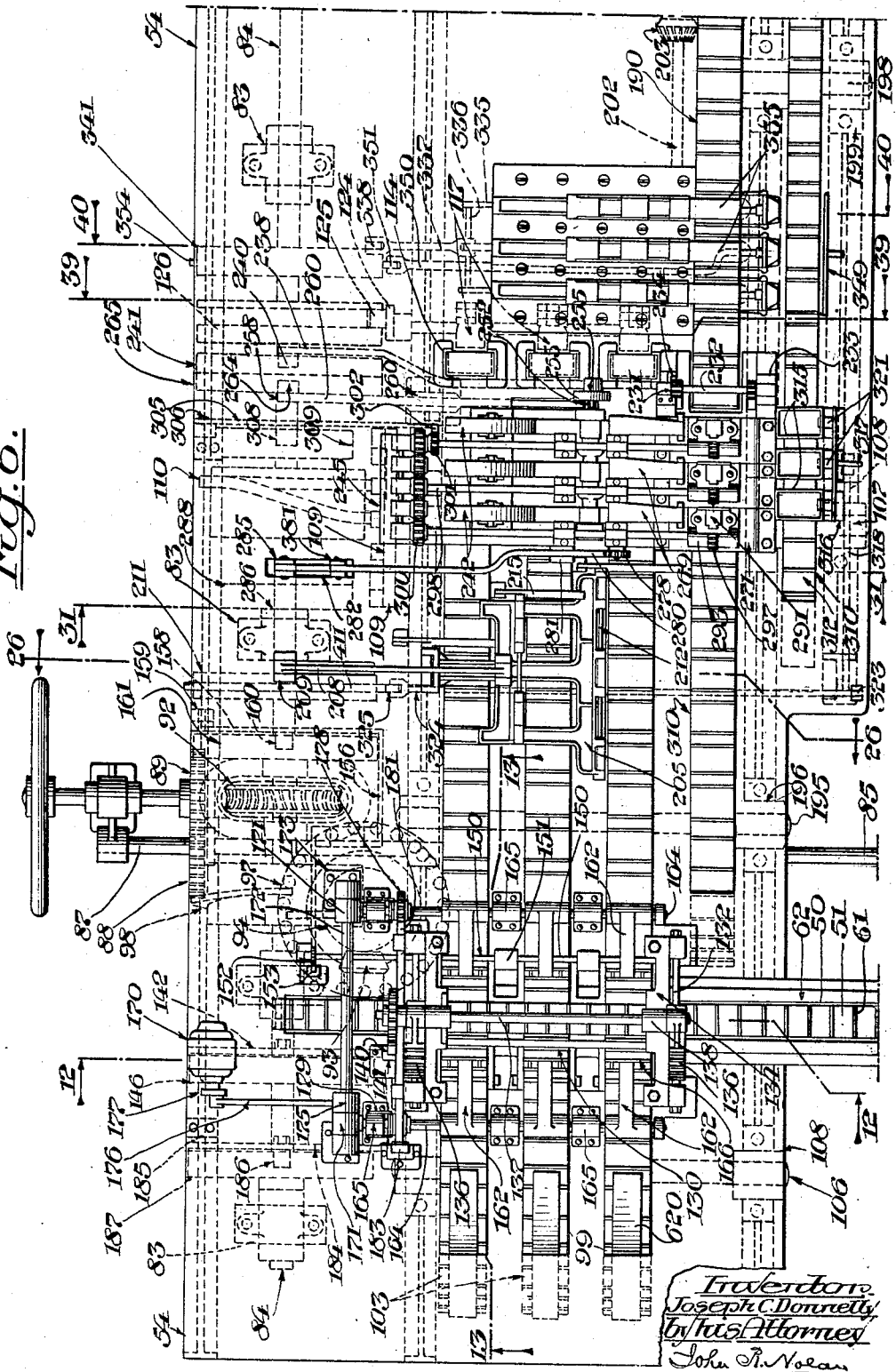

Feb. 21, 1933.   J. C. DONNELLY   1,898,717
MACHINE FOR PACKING MATCHES
Filed April 23, 1930   25 Sheets-Sheet 5
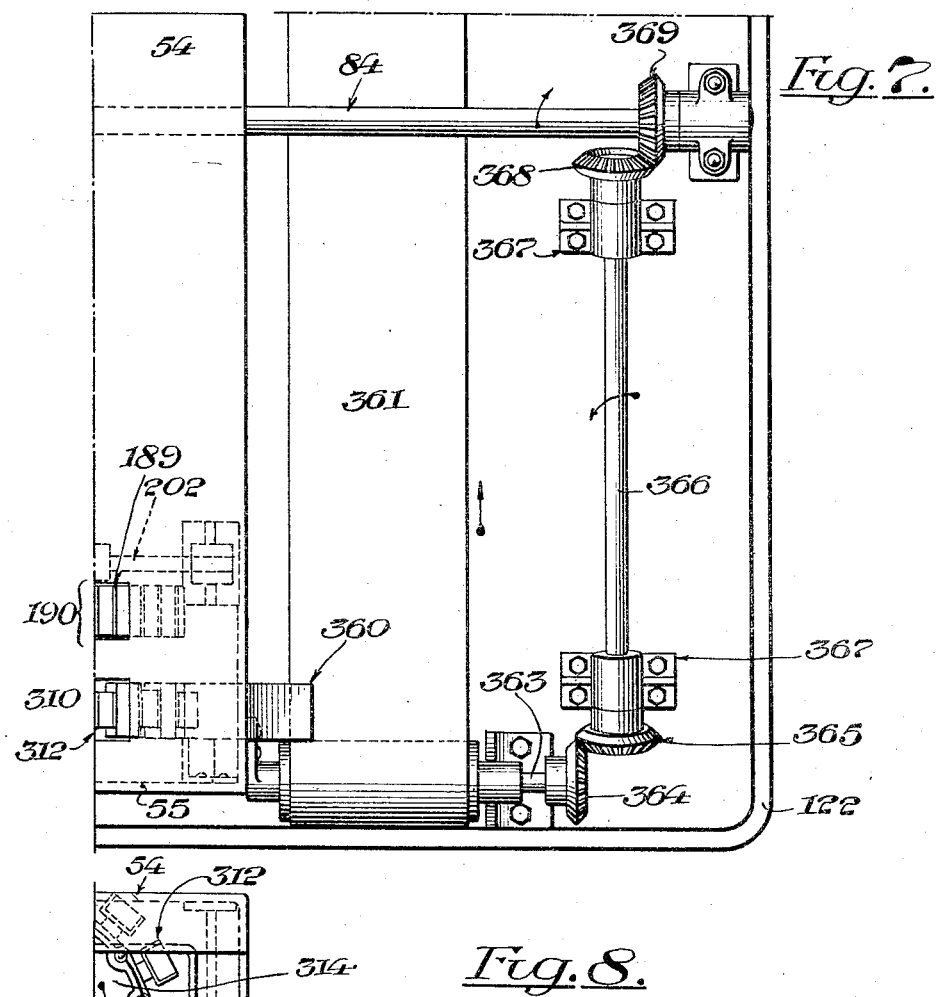
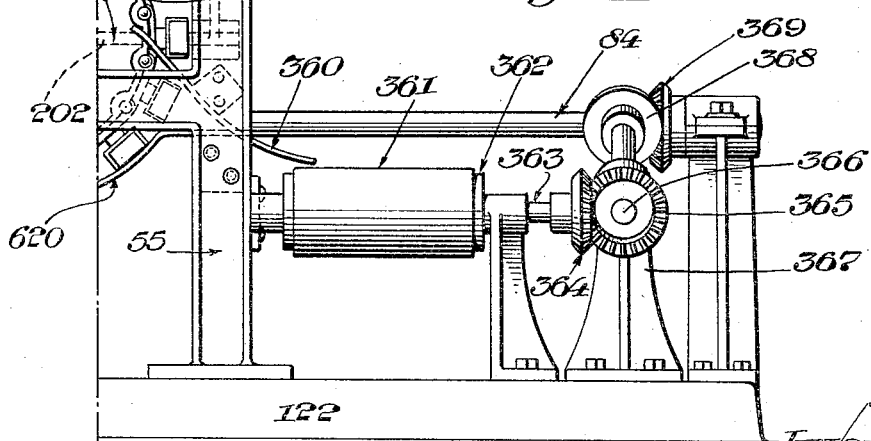

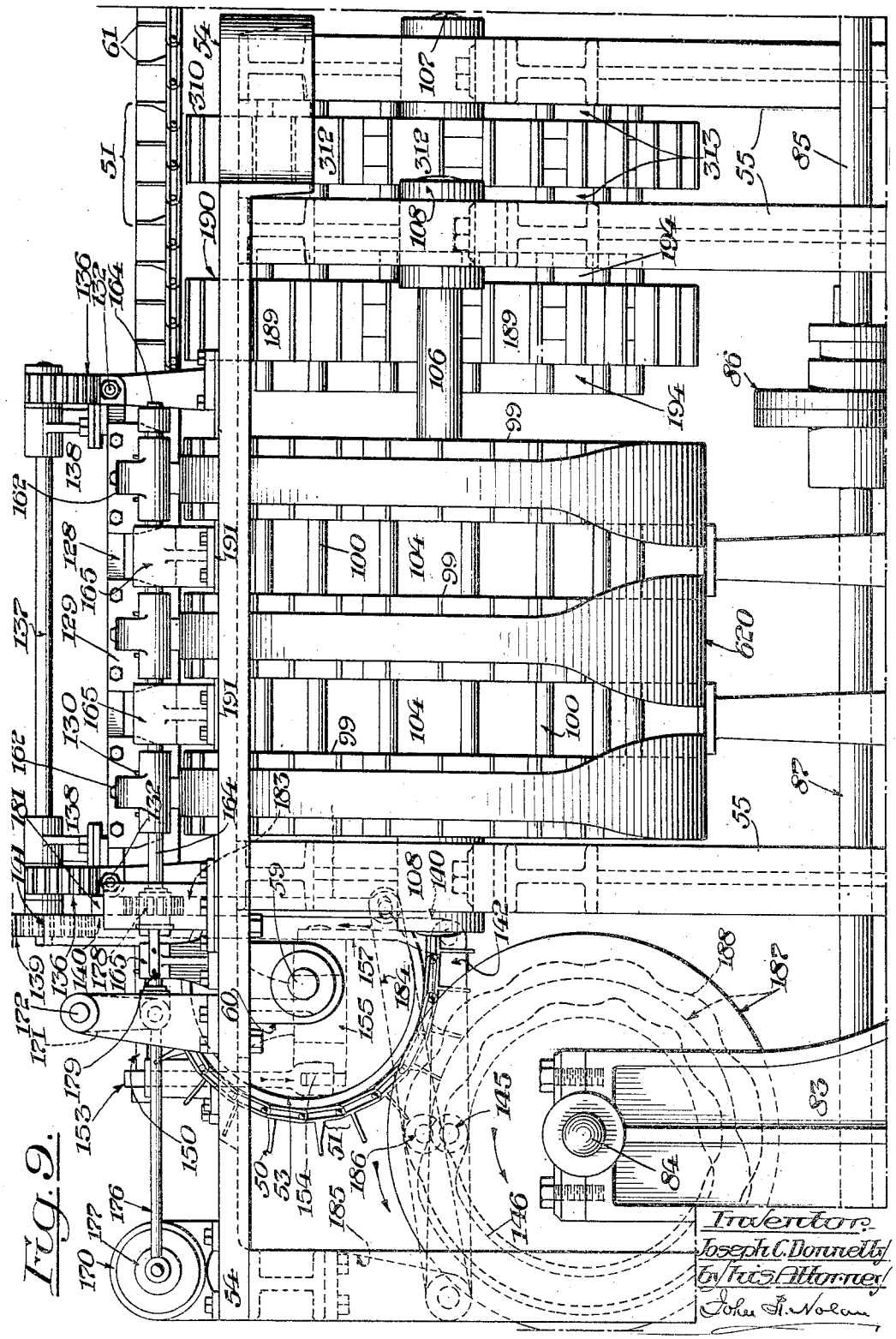

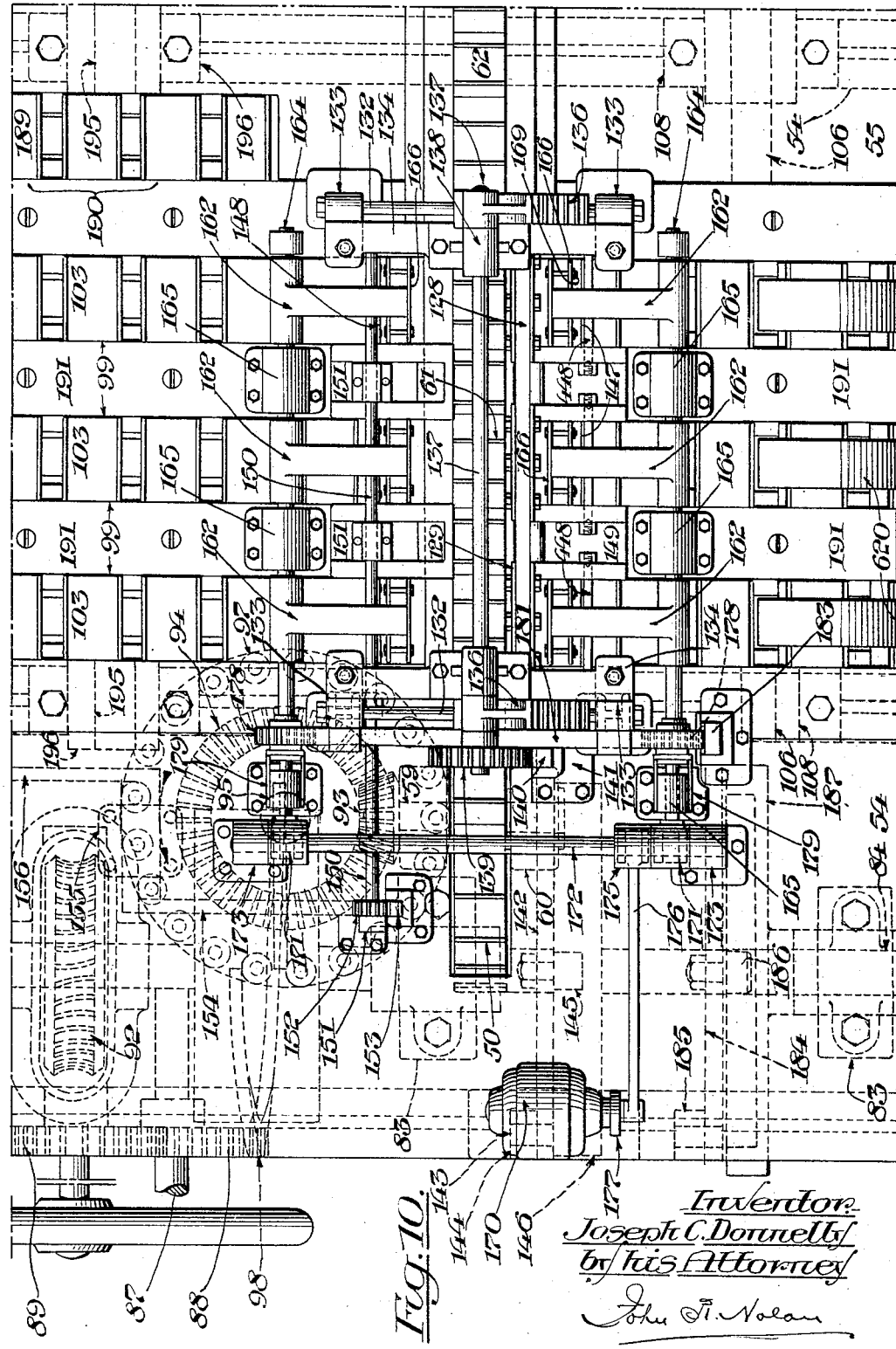

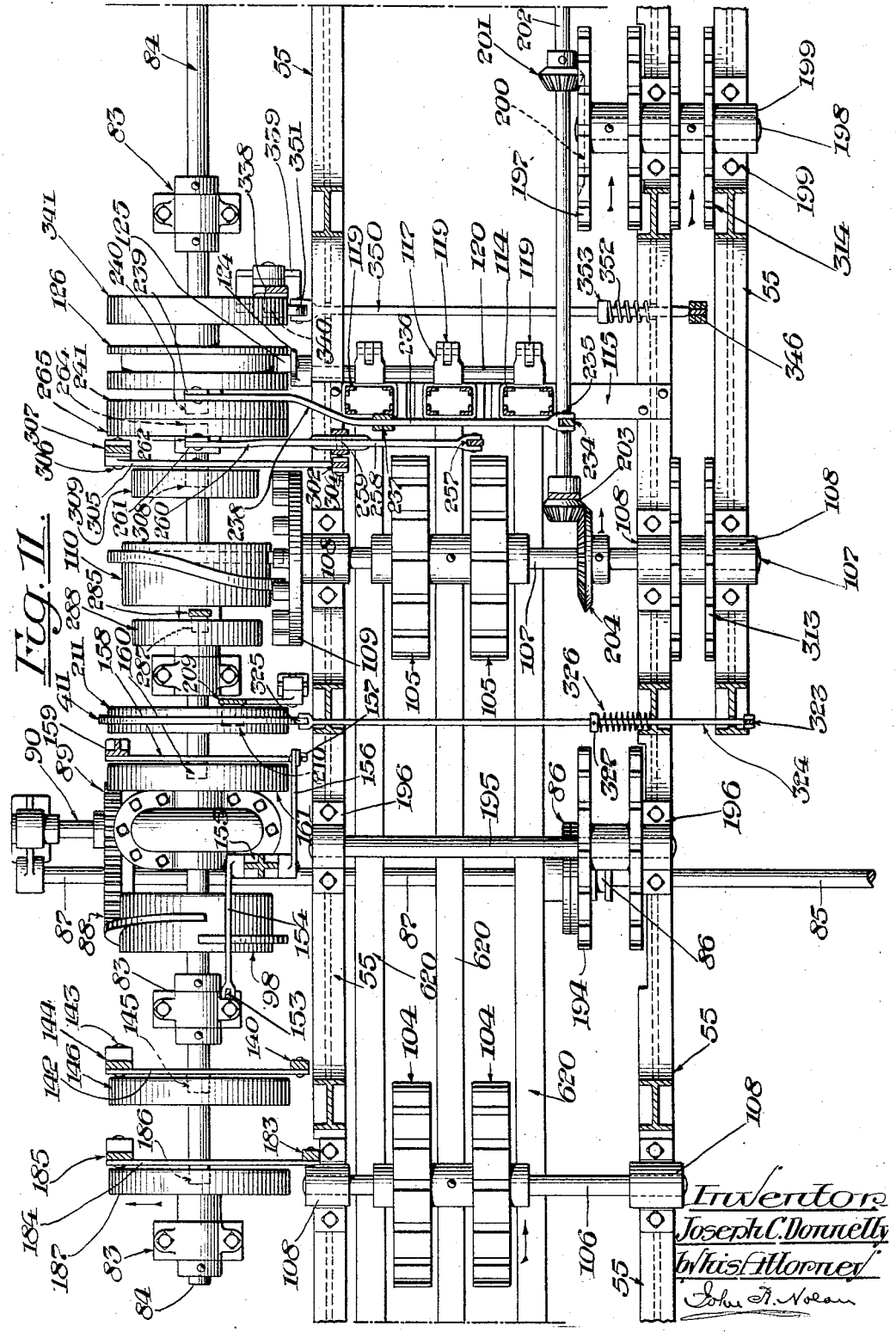

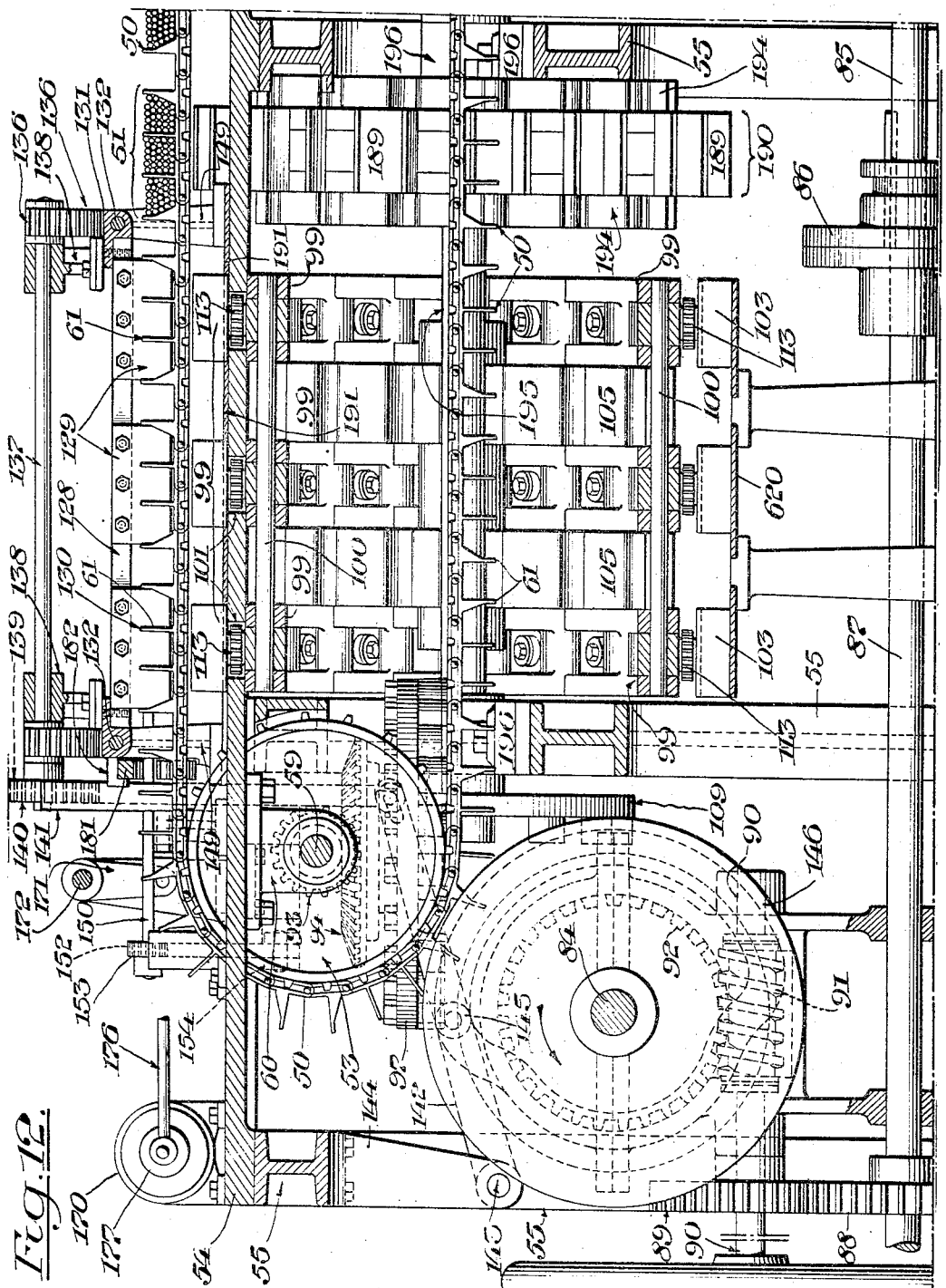

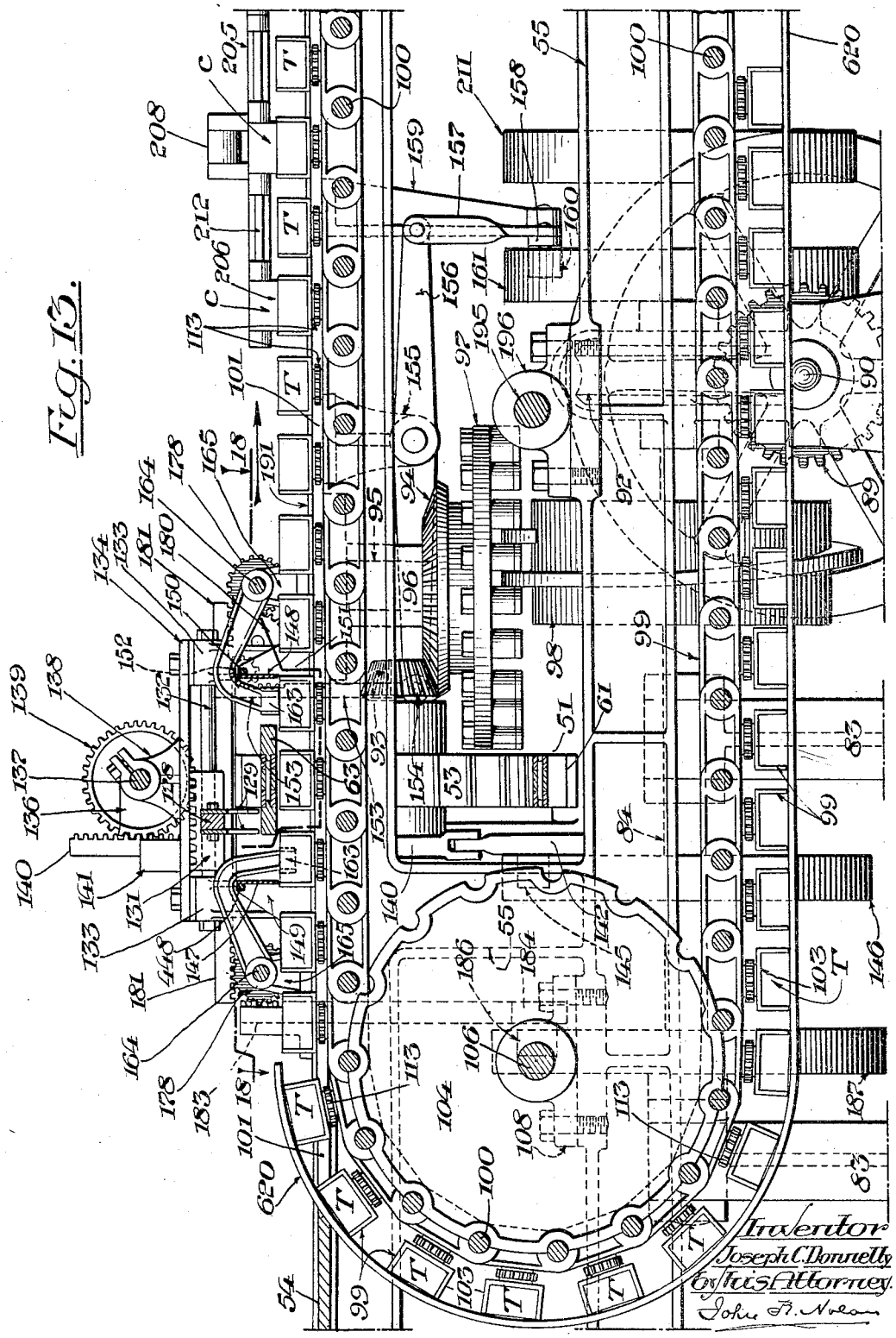

Feb. 21, 1933.  J. C. DONNELLY  1,898,717
MACHINE FOR PACKING MATCHES
Filed April 23, 1930  25 Sheets-Sheet 11
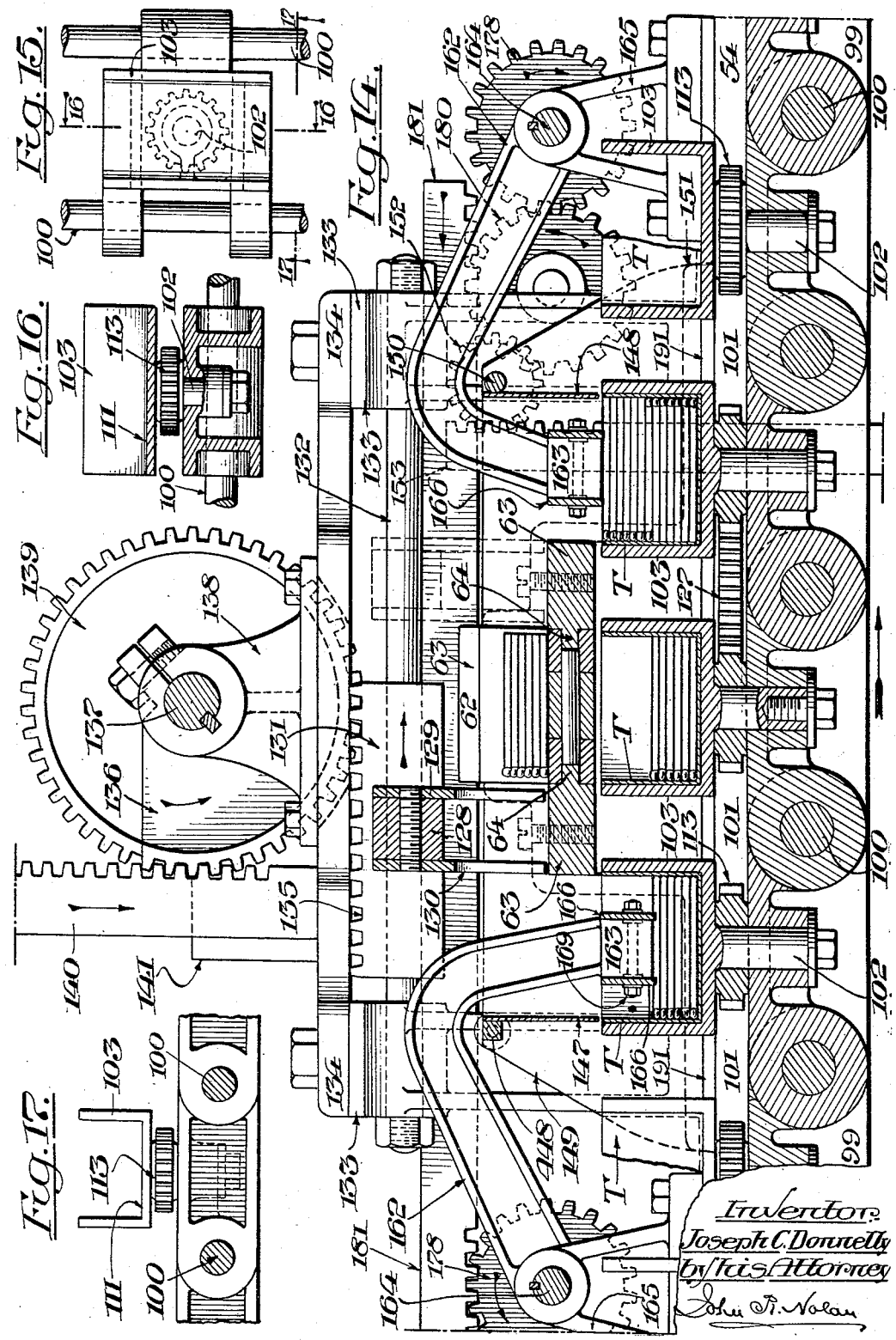
Inventor:
Joseph C. Donnelly
by his Attorney
John P. Nolan

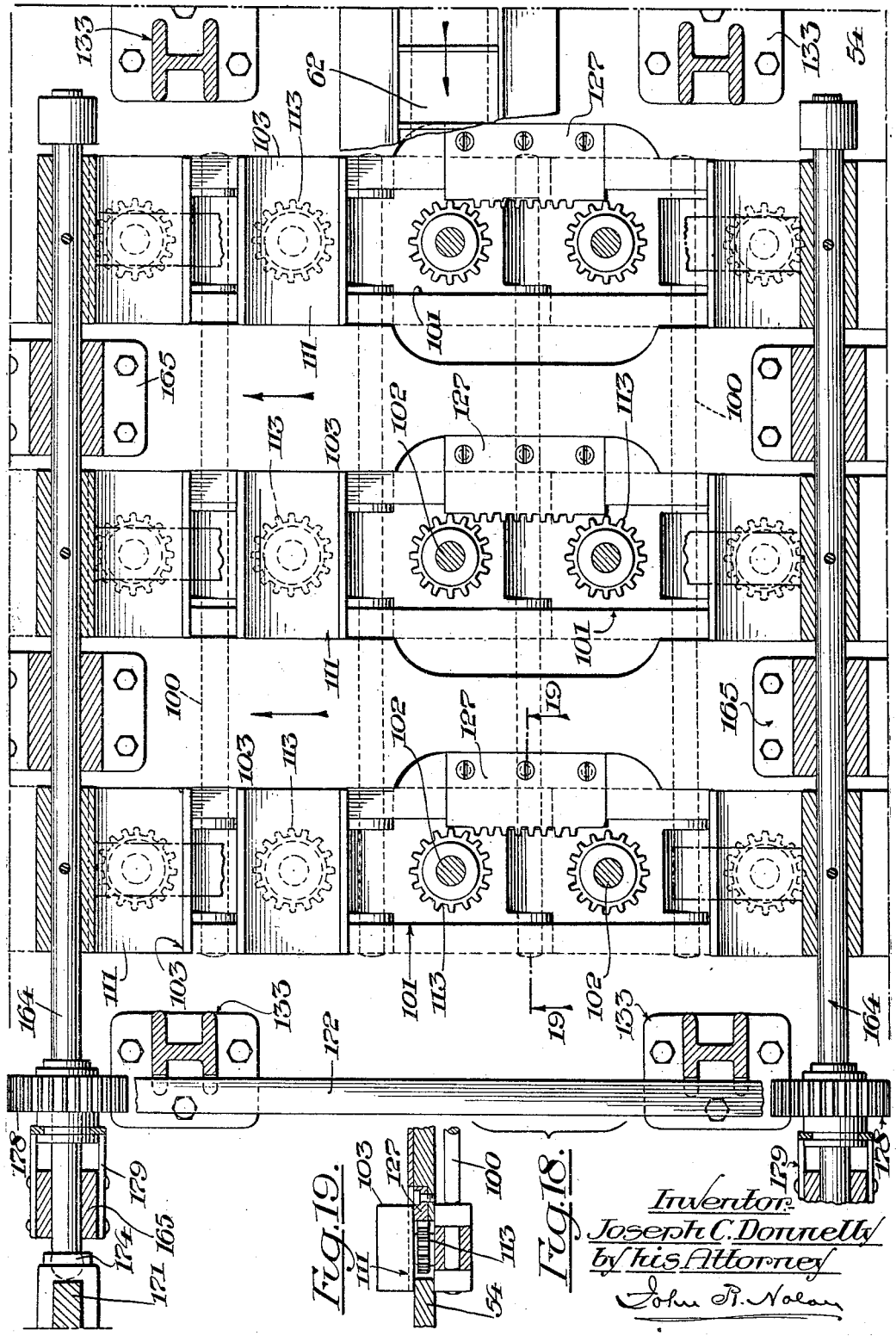

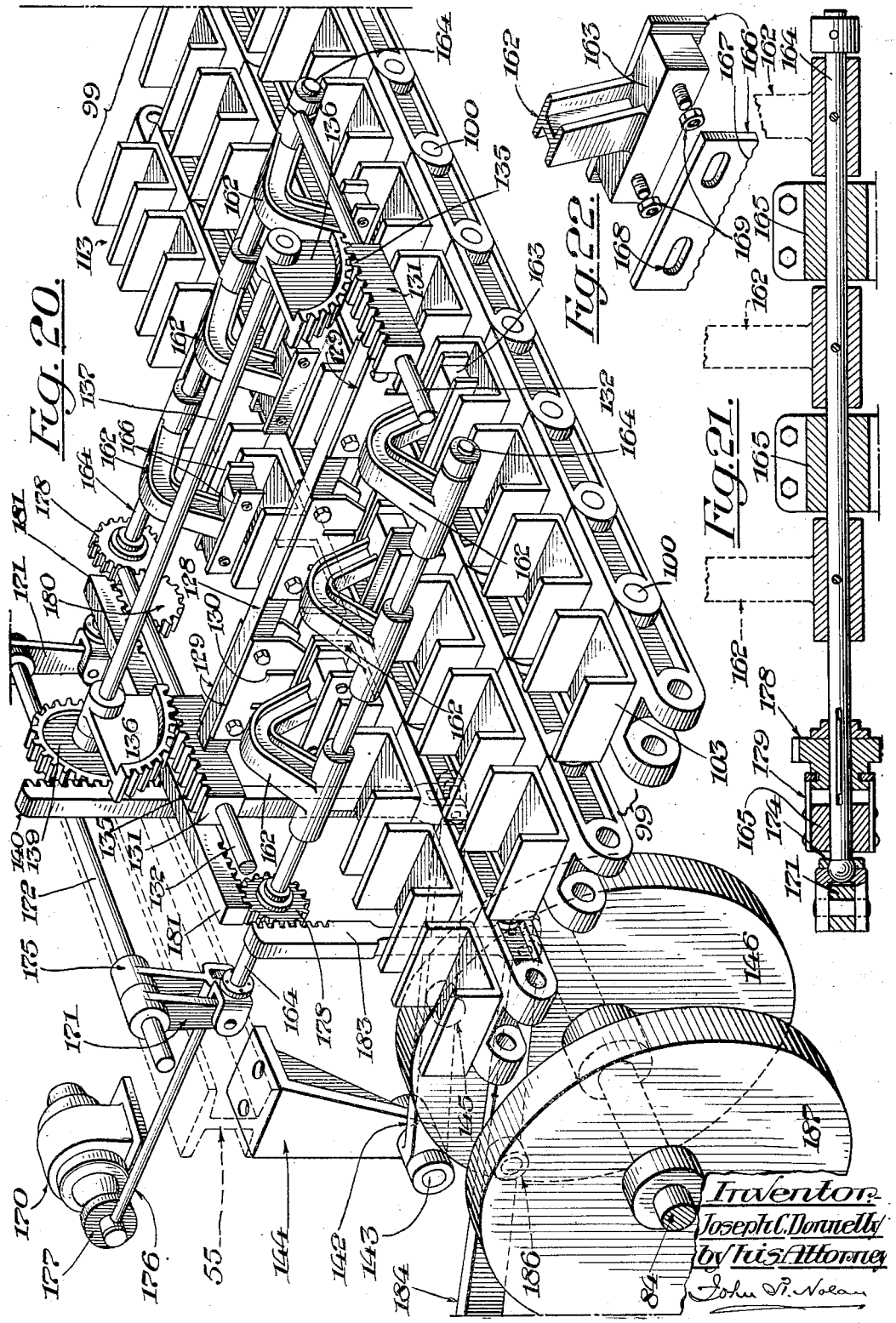

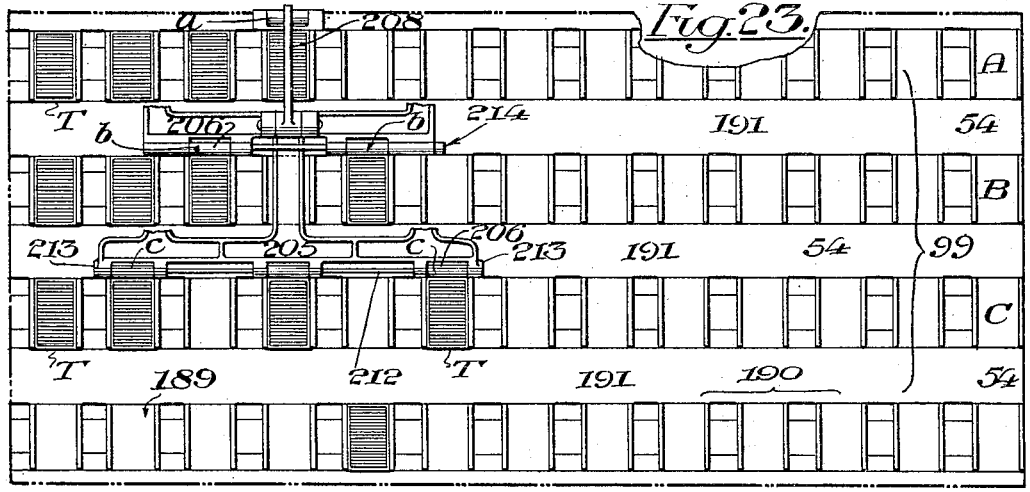
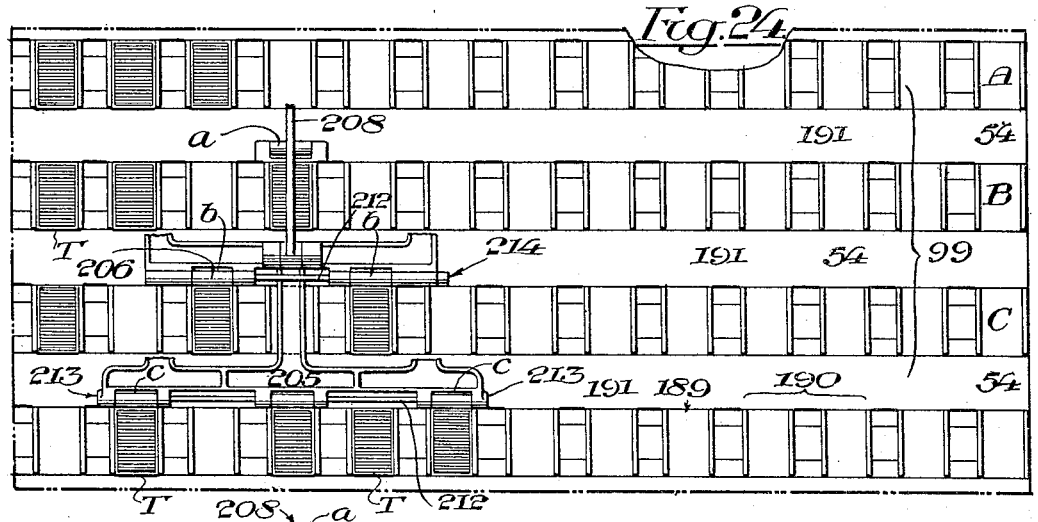
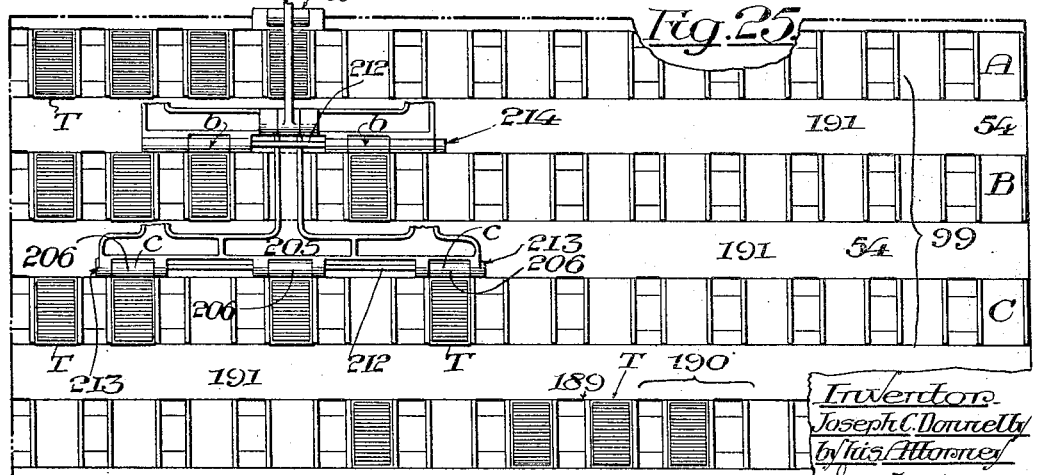

Feb. 21, 1933.  J. C. DONNELLY  1,898,717
MACHINE FOR PACKING MATCHES
Filed April 23, 1930   25 Sheets-Sheet 15
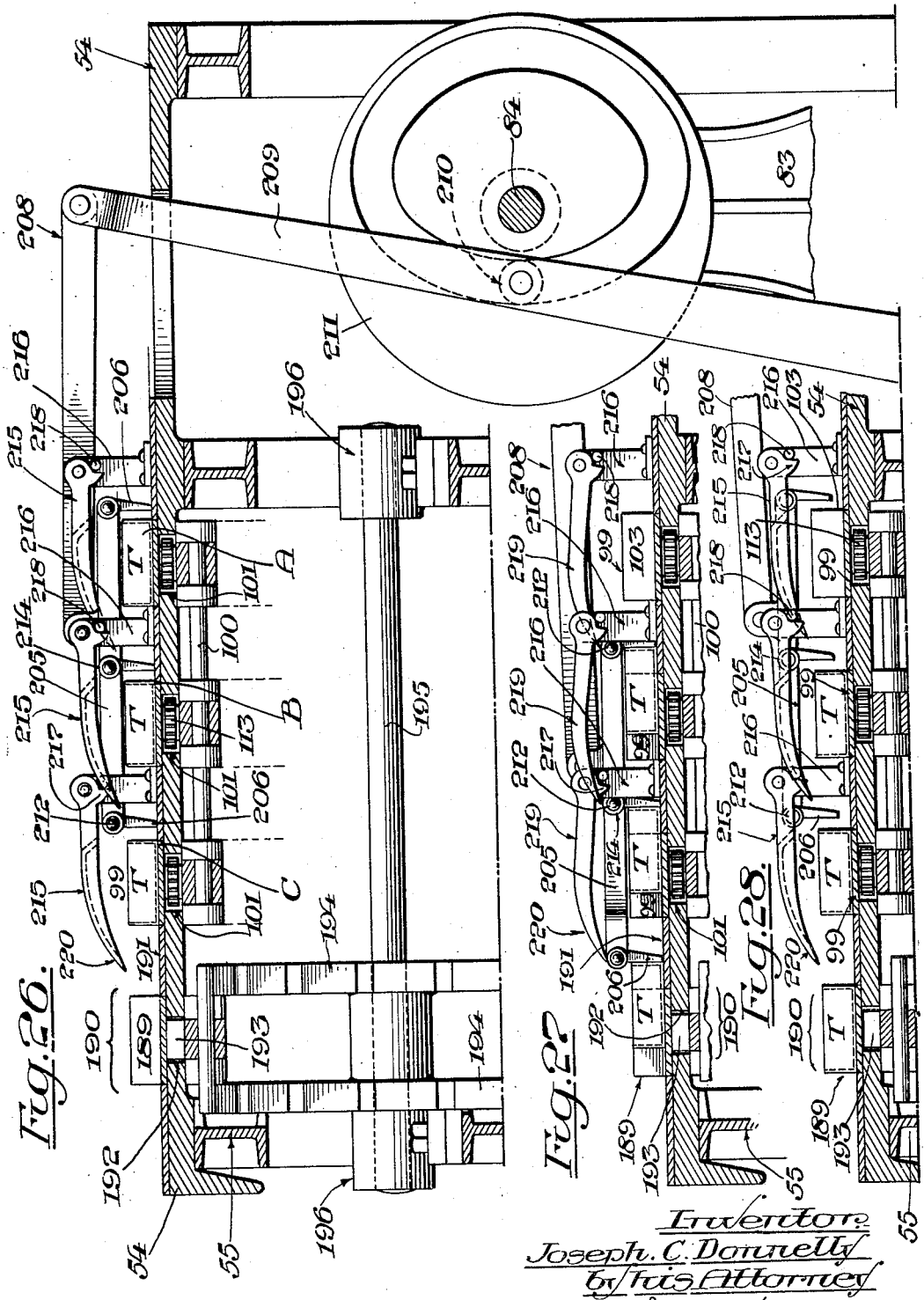
Inventor:
Joseph C. Donnelly
by his Attorney
John J. Nolan Feb. 21, 1933. J. C. DONNELLY 1,898,717
MACHINE FOR PACKING MATCHES
Filed April 23, 1930 25 Sheets-Sheet 16

Inventor
Joseph C. Donnelly
by his Attorney
John R. Nolan

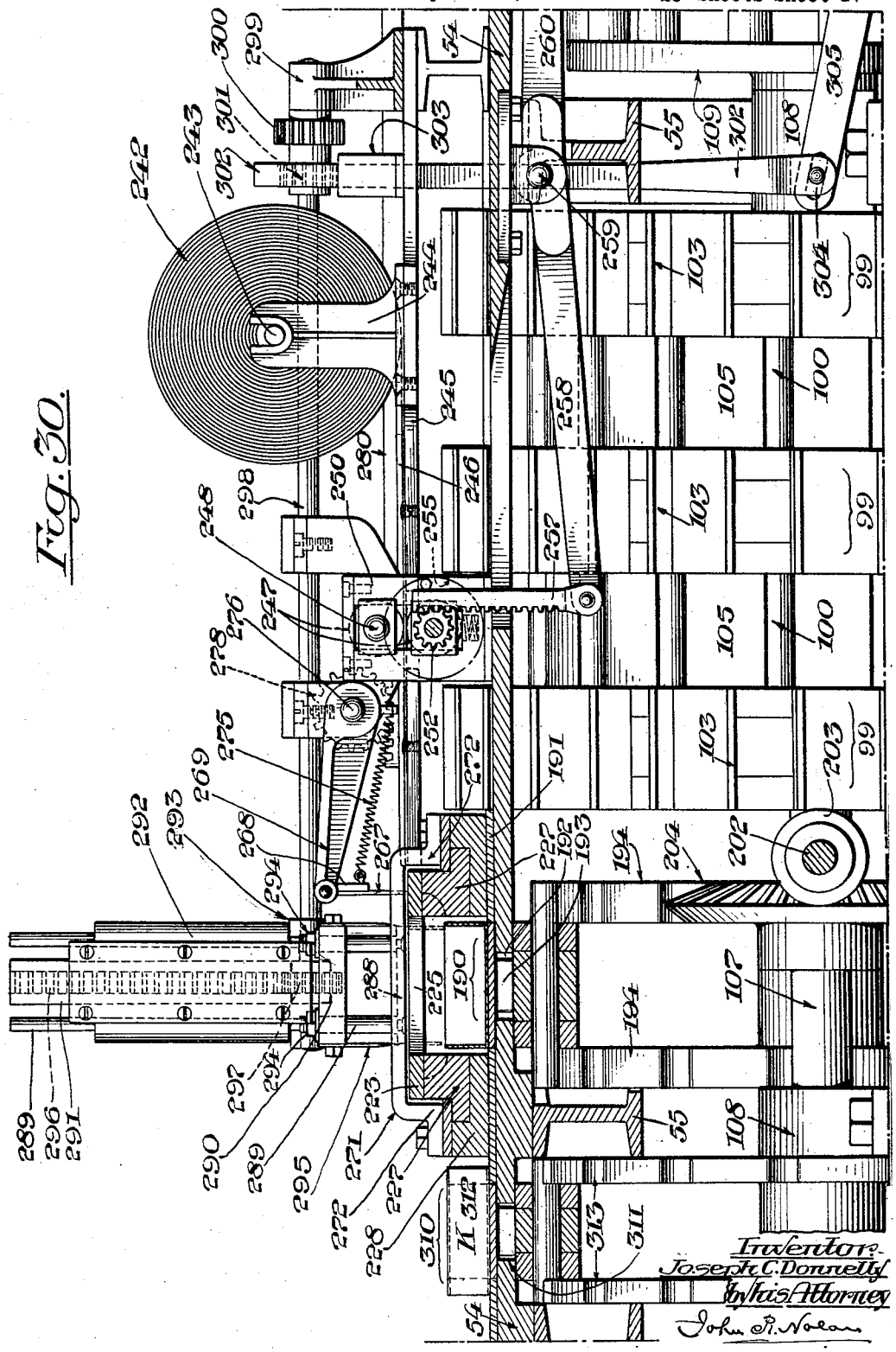

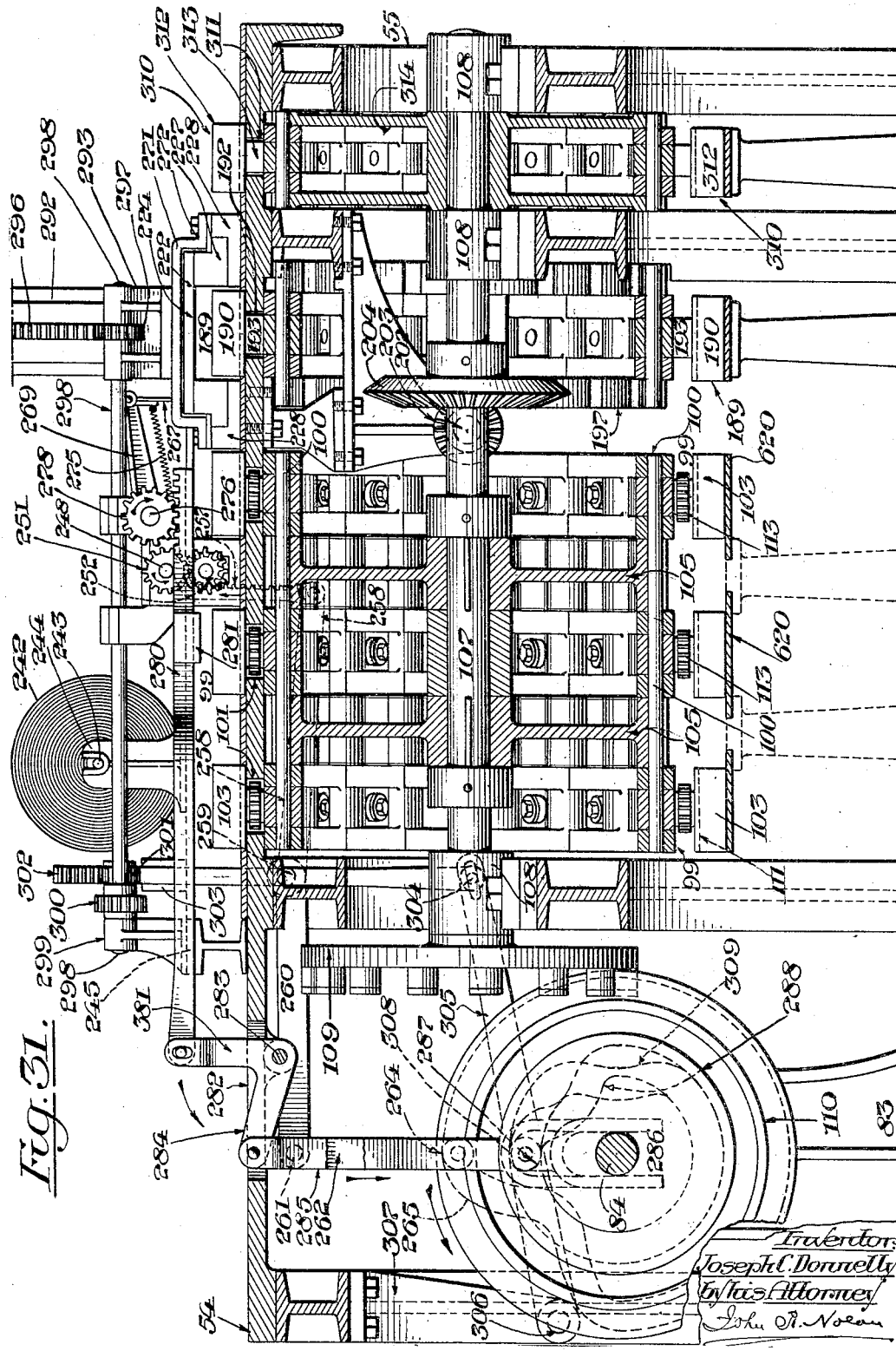

Feb. 21, 1933.  J. C. DONNELLY  1,898,717
MACHINE FOR PACKING MATCHES
Filed April 23, 1930   25 Sheets-Sheet 19
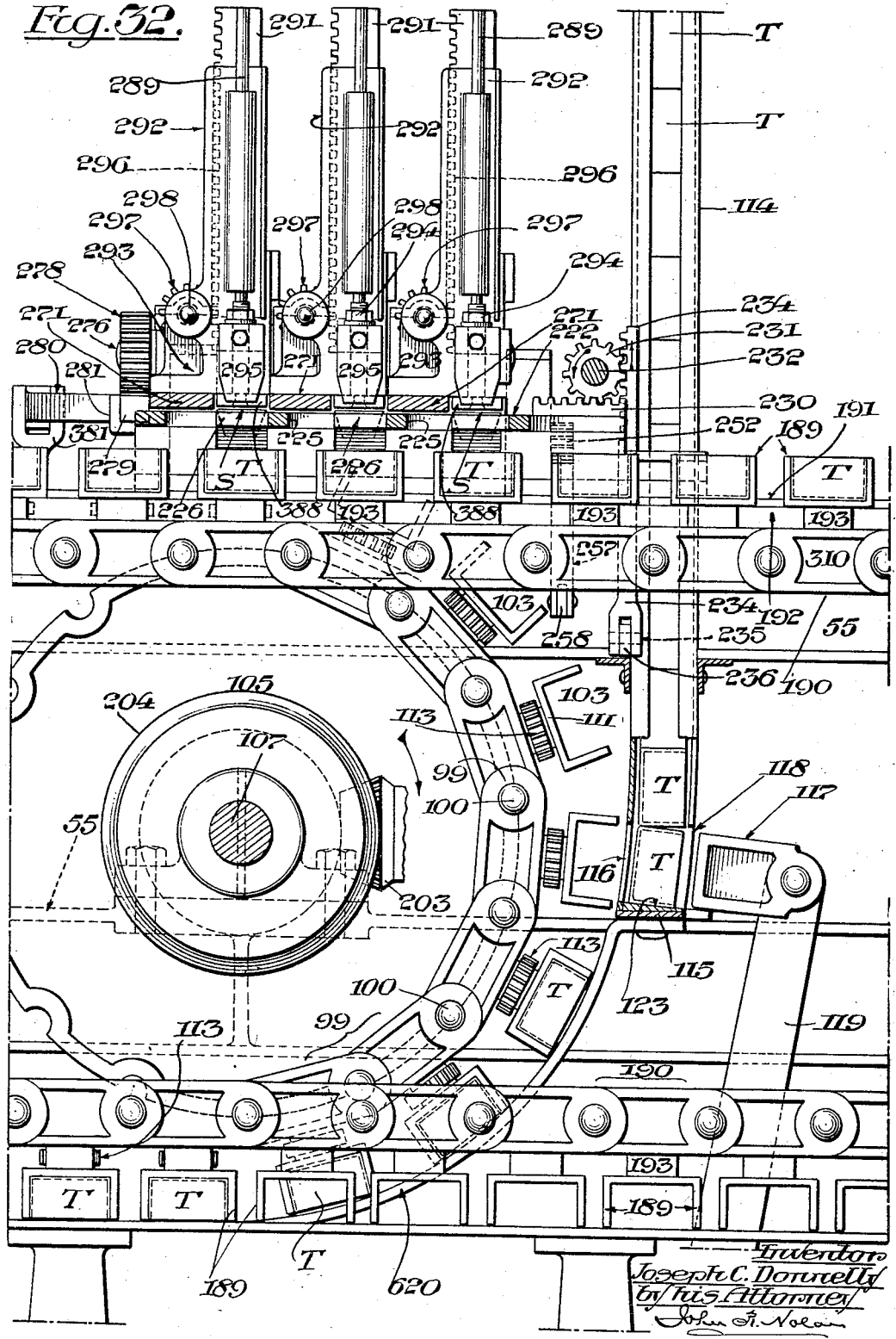

Feb. 21, 1933. J. C. DONNELLY 1,898,717
MACHINE FOR PACKING MATCHES
Filed April 23, 1930 25 Sheets-Sheet 20
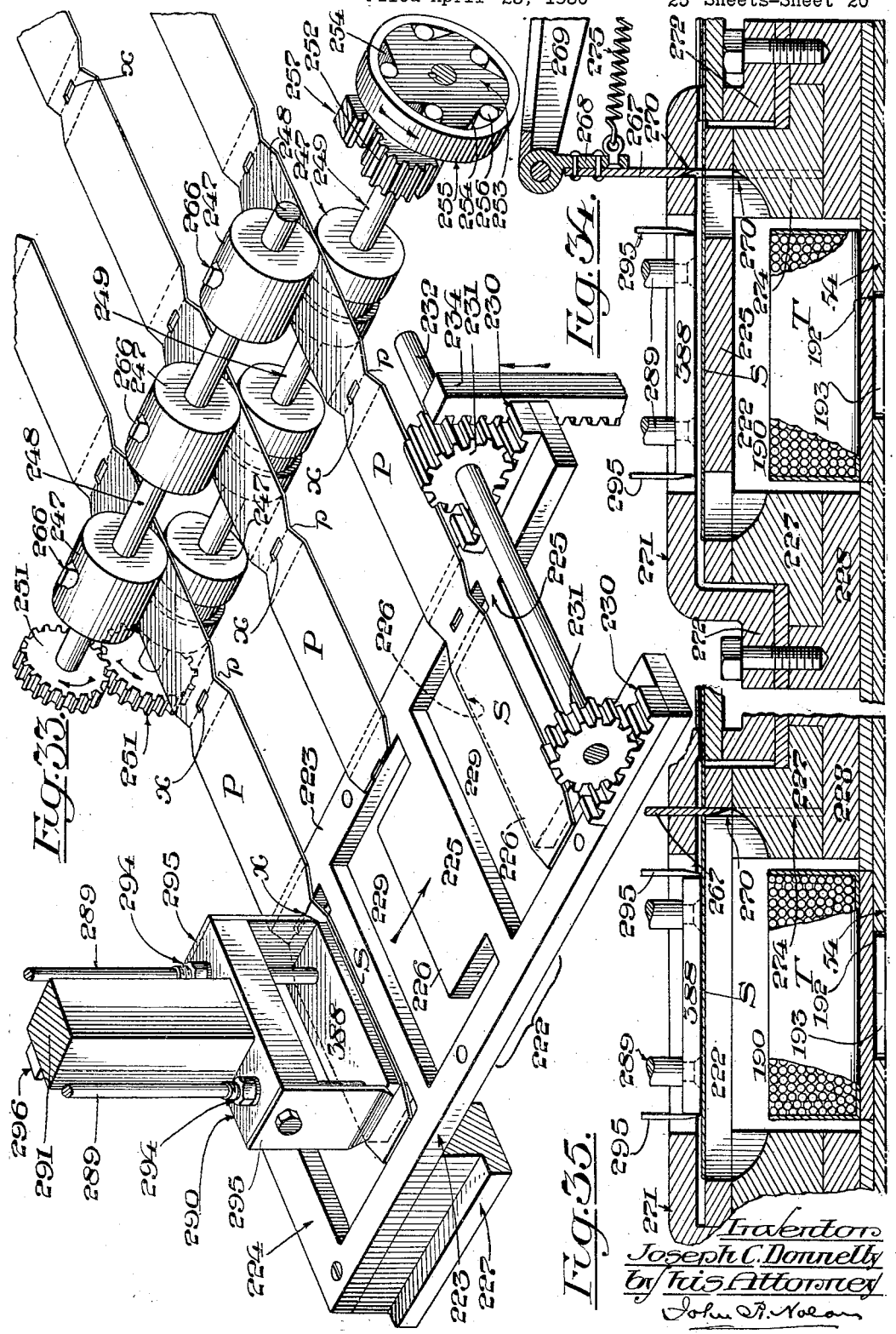

Feb. 21, 1933.  J. C. DONNELLY  1,898,717
MACHINE FOR PACKING MATCHES
Filed April 23, 1930  25 Sheets-Sheet 21
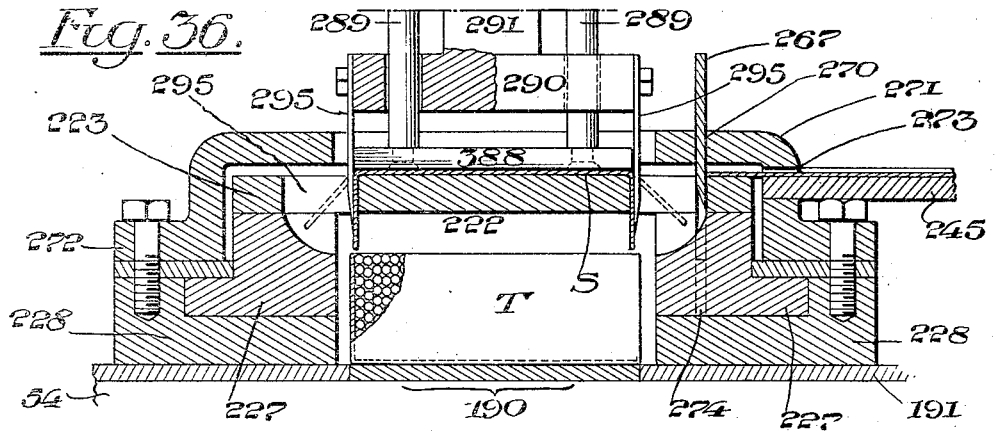
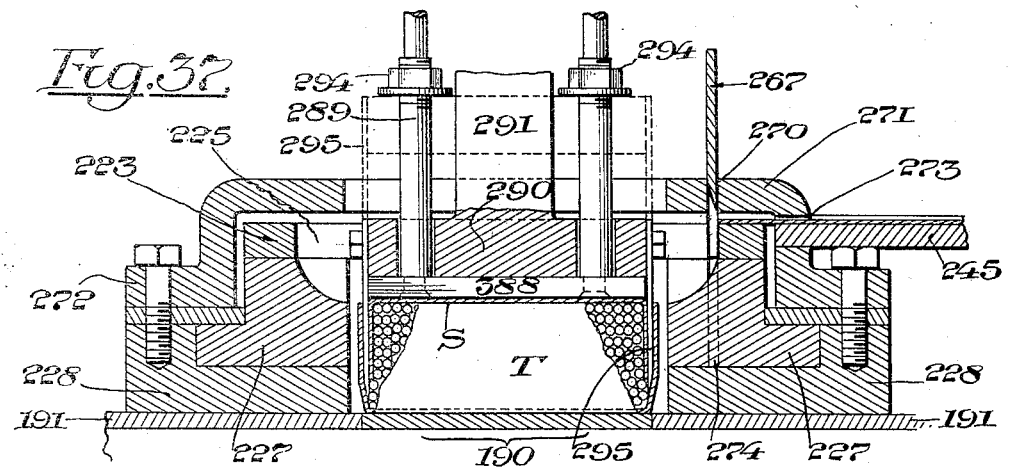
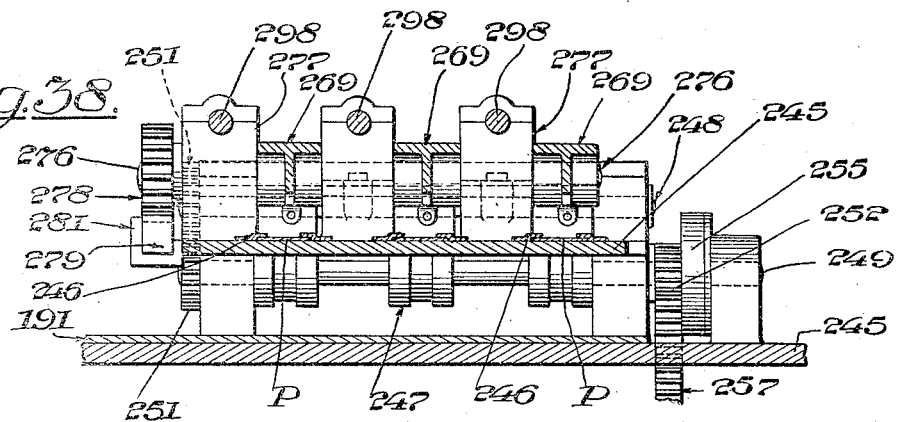
Inventor
Joseph C. Donnelly
by his Attorney
John P. Nolan

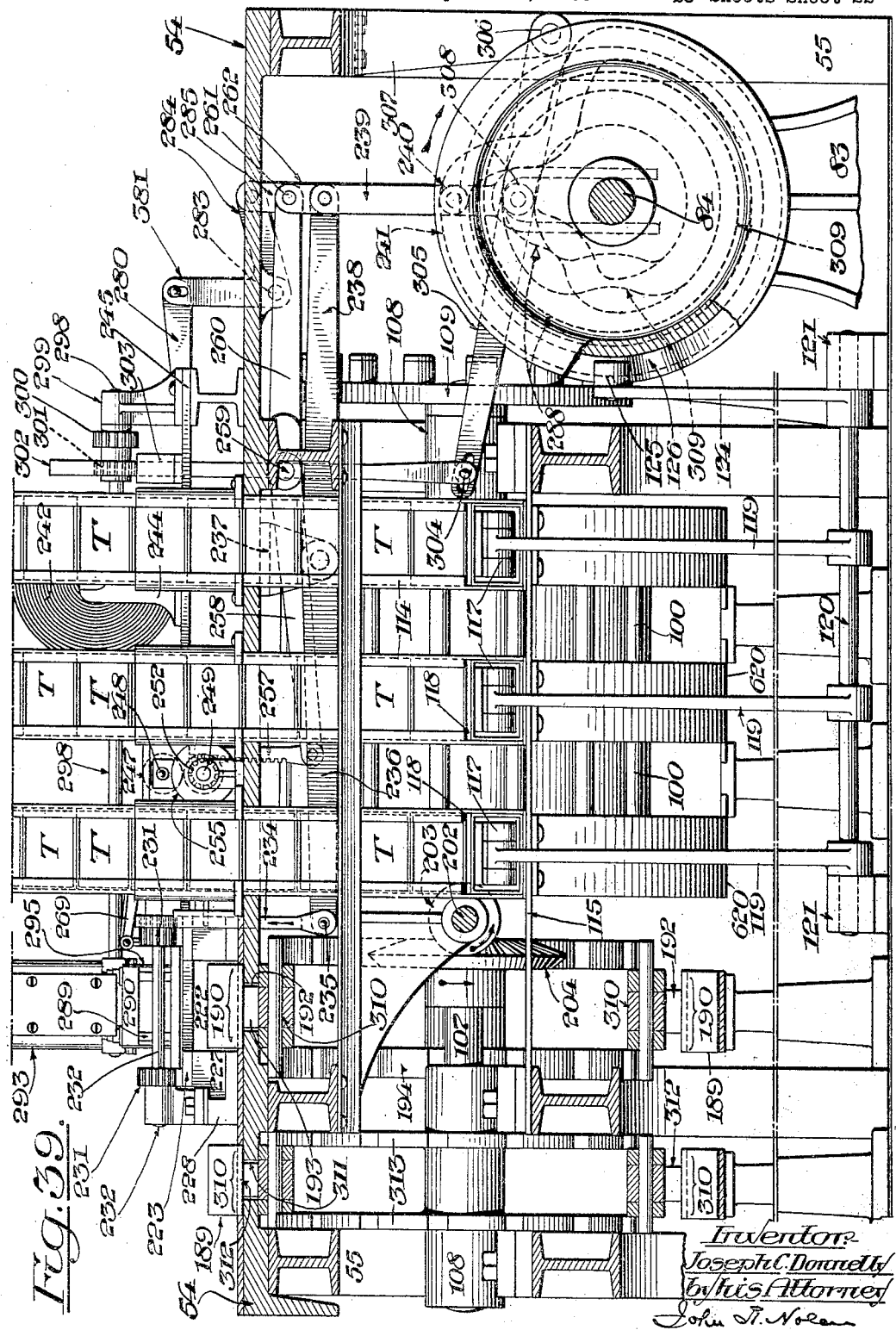

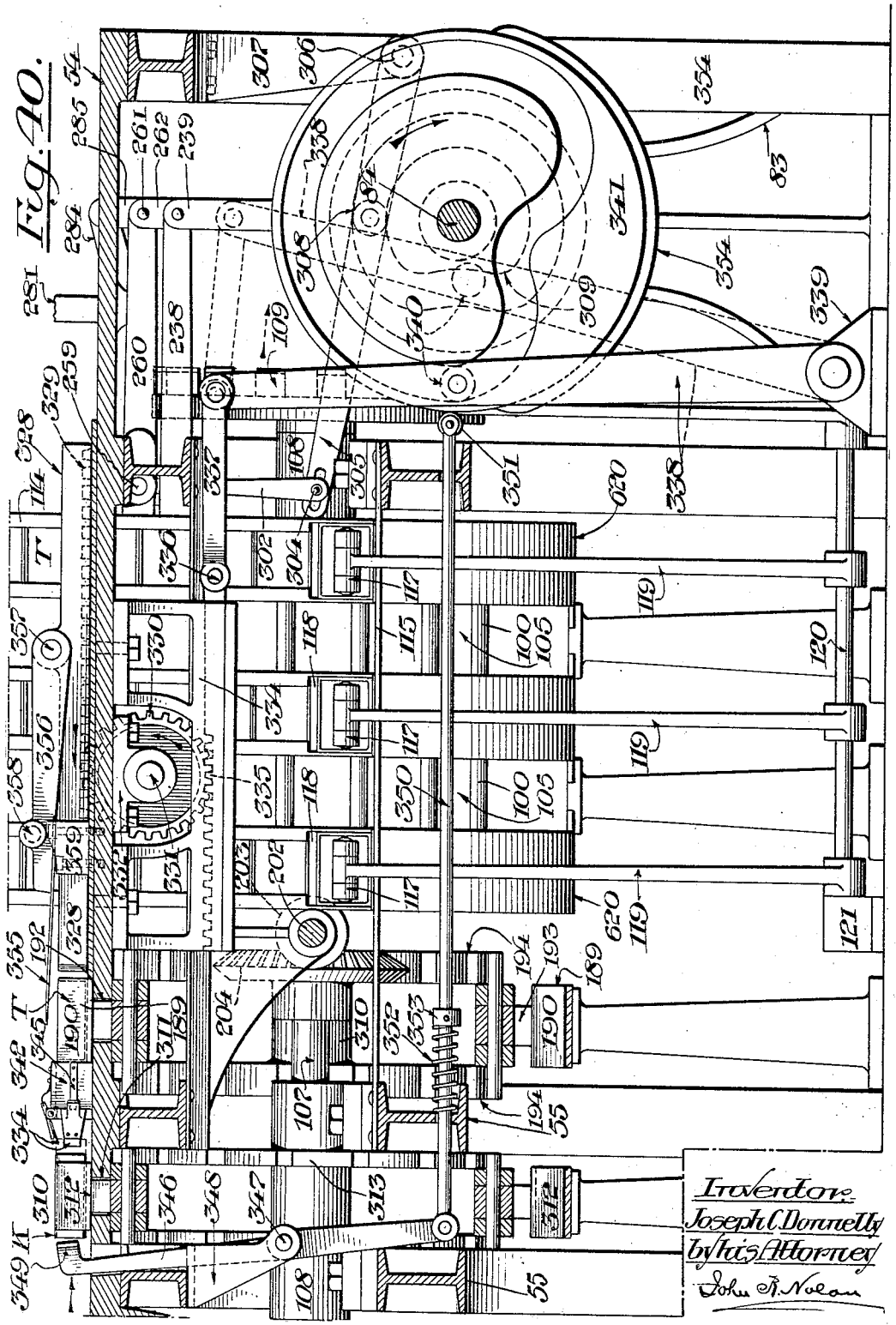

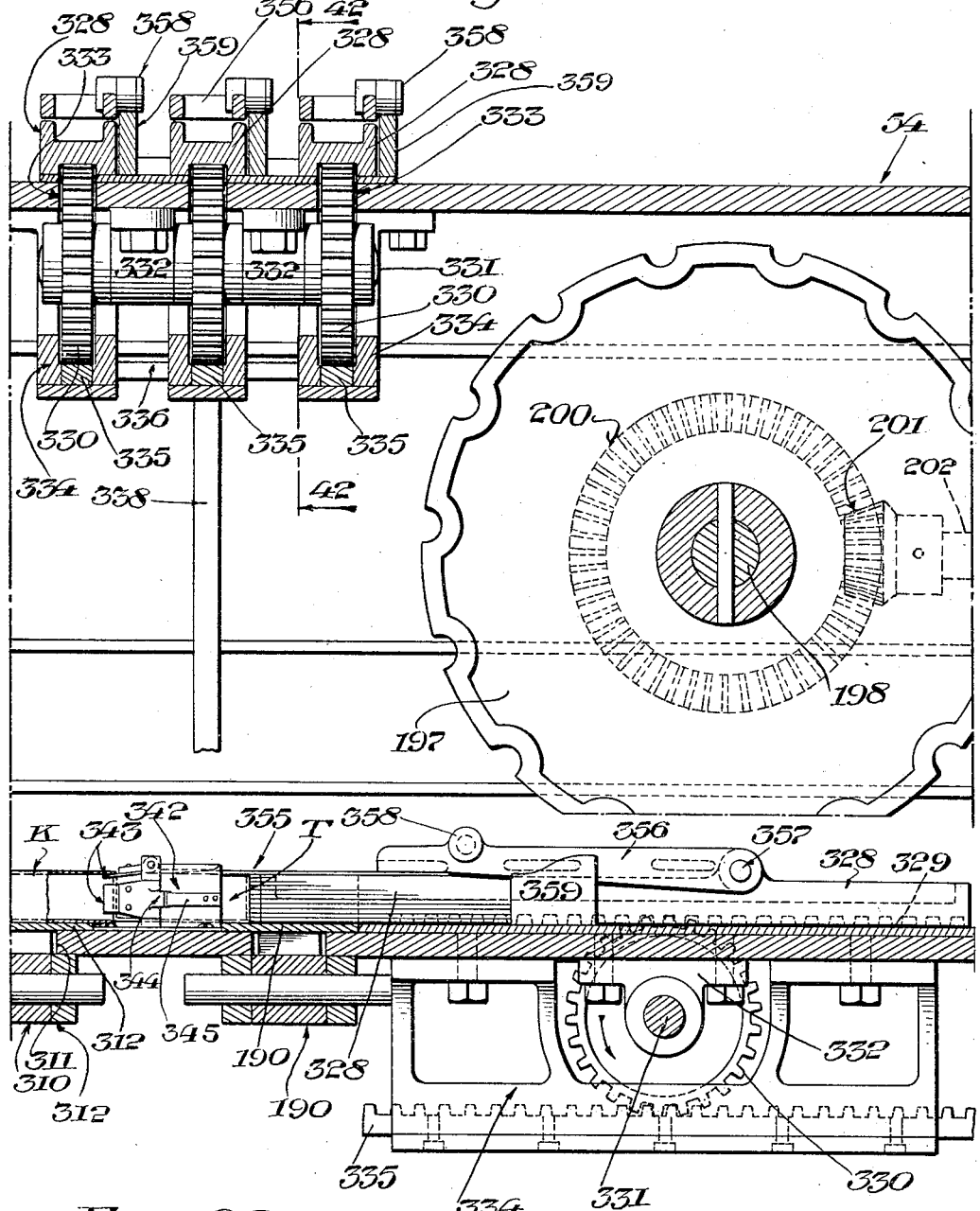

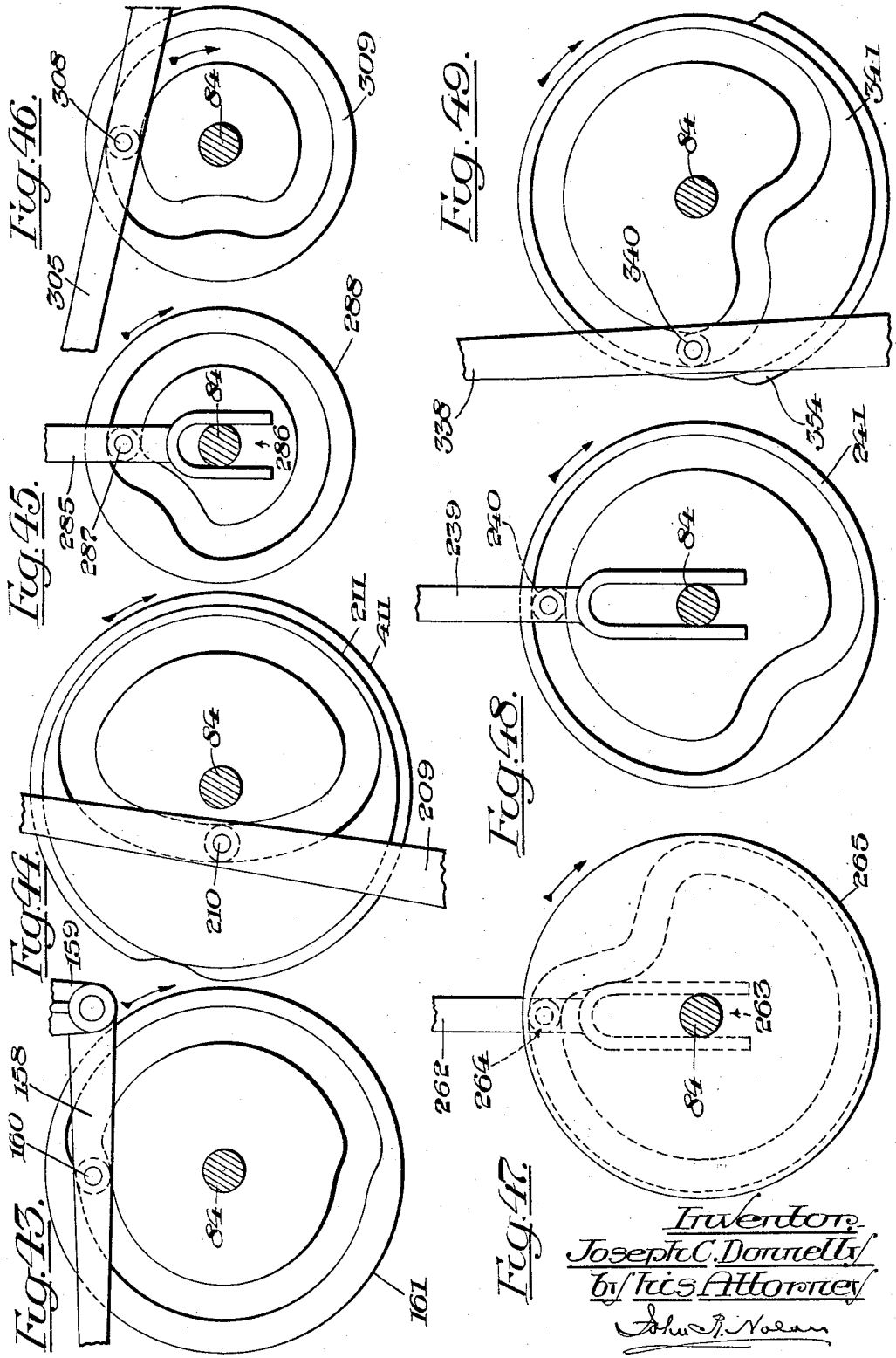

Patented Feb. 21, 1933

1,898,717

UNITED STATES PATENT OFFICE

JOSEPH C. DONNELLY, OF BARBERTON, OHIO, ASSIGNOR, BY MESNE ASSIGNMENTS, TO THE DIAMOND MATCH COMPANY, A CORPORATION OF MARYLAND

MACHINE FOR PACKING MATCHES

Application filed April 23, 1930. Serial No. 446,715.

This invention relates to machines for packing matches in boxes; having reference particularly, though not exclusively, to packing or filling machines which are associated with match making machines and are adapted to receive the finished matches from the latter and deliver them to box trays or other receptacles.

The principal object of my invention is to provide a match packing machine which, while effective to meet the maximum requirements of a high speed continuous match machine, is itself run at relatively low speed; the construction and operation of the organization being such that approximately measured quantities of matches are efficiently delivered to succeeding series of match trays which are then positioned in a single row and advanced in that relation to succeeding stations of the packing machine.

Another object of my invention is the provision of simple and efficient means whereby each of the box trays is supplied with two quantities of matches whereof the heads of one quantity are reversely disposed in relation to those of the other, thus ensuring a uniform and compact disposition of the matches in the box tray.

Another object of my invention is to provide for the efficient straightening and settling of the matches in the respective trays.

Another object of my invention is to provide novel means whereby the filled match trays are efficiently supplied with protection strips which overlie the match contents of the trays.

Another object of my invention is to provide novel means whereby the filled trays are efficiently nested in cover slides.

With these objects in view, and others which will presently appear, my invention comprises features of construction and combinations of parts which, in a preferred form of embodiment of my invention, will be hereinafter described; the scope of the invention then being defined in the appended claims.

In the drawings—

Figure 1 is an end elevation of a packing machine embodying the principle of my invention, the same being represented as associated with the delivery end of a continuous match making machine.

Fig. 2 is a transverse vertical section through the receiving end of the packing machine, adjacent the match punch-out mechanism of the match machine, as on the line 2—2 of Fig. 1.

Fig. 3 is a similar section, as on the line 3—3 of Fig. 1.

Fig. 4 is a transverse vertical section on a plane through the match conveyer, looking toward one side of the main mechanism of the packing machine, as on the line 4—4 of Fig. 1.

Fig. 5 is an elevation looking toward the opposite side of the machine.

Fig. 6 is a plan of the mechanism shown in Figs. 4 and 5.

Fig. 7 is a plan of the delivery end of the packing machine.

Fig. 8 is a side elevation of the mechanism shown in Fig. 7.

Fig. 9 is an end elevation, on a larger scale, of the mechanism shown at the left of Fig. 1.

Fig. 10 is a plan, on a larger scale, of the match transfer and associated mechanisms shown at the left of Fig. 6.

Fig. 11 is a transverse horizontal section through the packing machine, as on the line 11—11 of Fig. 4.

Fig. 12 is a transverse vertical section through the packing machine, adjacent the match conveyer, as on the line 12—12 of Fig. 6.

Fig. 13 is a longitudinal vertical section of a portion of the packing machine in a plane through the match conveyer and the match transfer mechanism, as on the line 13—13 of Fig. 6.

Fig. 14 is a similar section, on a larger scale, through the match conveyer, match transfer mechanism, multi-row tray conveyer, and associated parts.

Fig. 15 is a plan of one of the partially-rotatable tray holders and its link.

Fig. 16 is a transverse section, through the said tray holder and link, as on the line 16—16 of Fig. 15.

Fig. 17 is a longitudinal vertical section of the same, as on the line 17—17 of Fig. 15.

Fig. 18 is a longitudinal horizontal section, partly in plan, of the multi-row tray conveyer in the region of the filling station, as on the irregular line 18—18, Fig. 13.

Fig. 19 is a vertical section through one of the links and its associated tray holders, and its adjuncts, as on the line 19—19 of Fig. 18.

Fig. 20 is a perspective view of a portion of the multi-row tray conveyer, the match transfer mechanism, and the match straightening and settling mechanism.

Fig. 21 is a sectional elevation of the vibratory shaft and connections of the straightening and settling mechanism.

Fig. 22 is a perspective view of one of the members of the vibratory straightening and settling heads.

Figs. 23, 24 and 25 are plans of portions of the multi-row tray conveyer and the juxtaposed single-row tray conveyer, showing the tray transfer device in its succeeding positions while transferring the trays from the multi-row conveyer to the single-row conveyer.

Fig. 26 is a transverse vertical section on a plane through the table adjacent the tray-transfer device, as on the line 26—26 of Fig. 6, said device being in rearward position preparatory to its advancing the trays in respect to the tray conveyers.

Fig. 27 is a similar section, showing the tray-transfer device partially advanced.

Fig. 28 is a similar section, showing the tray-transfer device in its back stroke.

Fig. 30 is a transverse vertical section in a plane through a portion of the table adjacent one side of the protection-strip mechanism, as on the line 30—30 of Fig. 29.

Fig. 31 is a similar section in a plane through the table adjacent the opposite side of the protection-strip mechanism, as on the line 31—31 of Fig. 6.

Fig. 32 is a longitudinal vertical section in a plane through the plural protection-strip former, as on the line 32—32 of Fig. 29.

Fig. 33 is a perspective view of the said former, and the feed-roll mechanism for supplying the strip stock thereto, showing one of the plungers and its associated parts in co-operative relation to one of the former members.

Figs. 34, 35, 36 and 37 are transverse sections of the former and co-operating parts in relation to a filled box tray, showing the succeeding steps of severing a protection strip length from a web, bending down the ends of said strip, and inserting the strip in the filled tray.

Fig. 38 is a partial section, as on the line 38—38 of Fig. 29, showing the guides for the protection-strip webs and means for simultaneously operating the cutters.

Fig. 39 is a transverse vertical section in a plane through the table, adjacent the tray magazines, as on the line 39—39 of Fig. 6, showing the mechanism, including parallel nesting plungers, for advancing a plurality of covers from the cover conveyer to the adjacent tray conveyer.

Fig. 40 is a similar section adjacent the lower-advancing mechanism for the plungers, as on the line 40—40 of Fig. 6.

Fig. 41 is a longitudinal vertical section through the table in a plane through the nesting plungers, and adjuncts.

Fig. 42 is a transverse vertical section adjacent one of the nesting plungers, as on the line 42—42 of Fig. 41.

Figure 29:
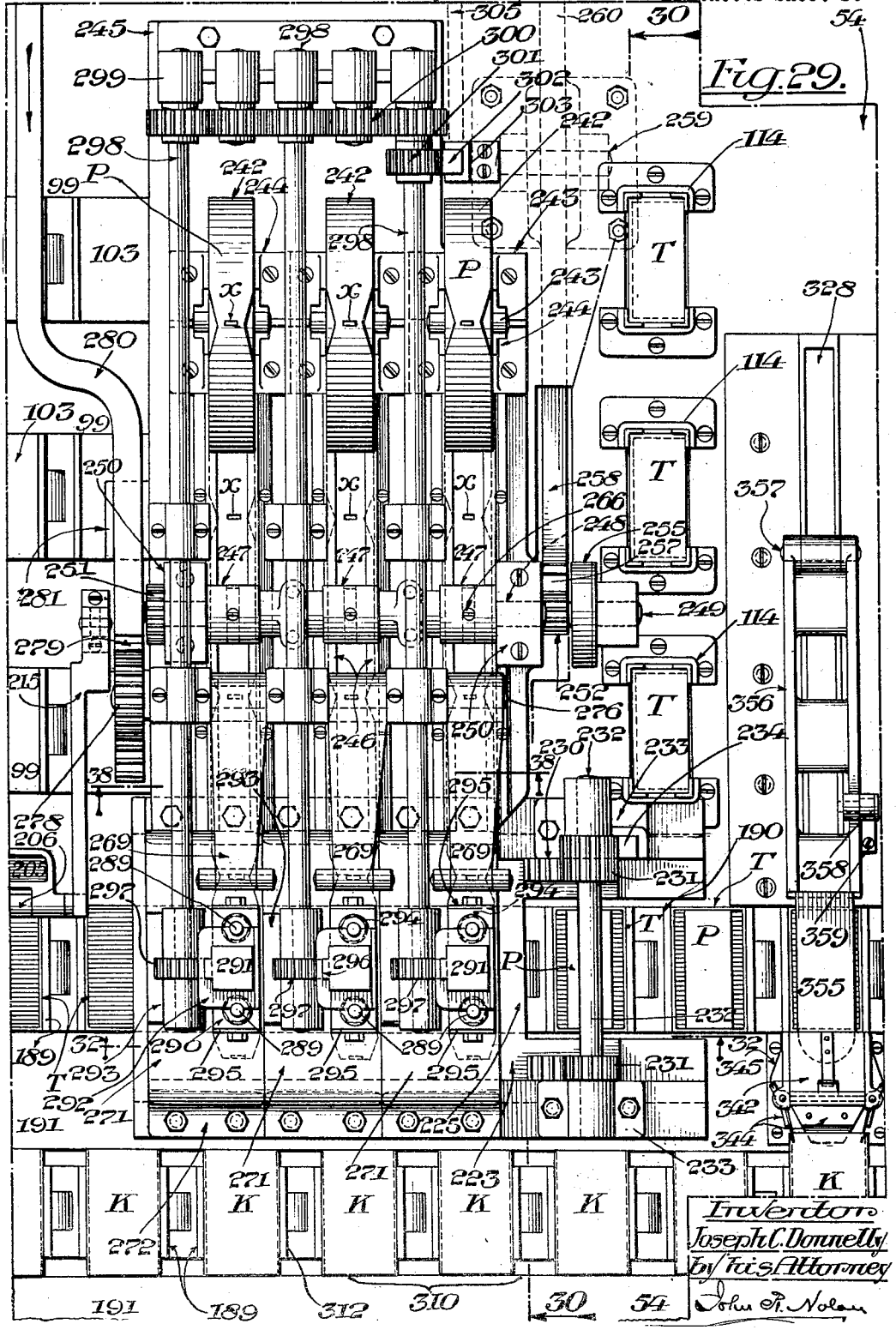
Fig. 29 is a plan, on a larger scale, of the protection-strip forming and applying mechanism, and adjacent parts, including the tray supply magazines, shown in Fig. 6.

Figs. 43 to 49, inclusive, represent various cams hereinafter referred to.

Referring to the drawings, 50 designates a conveyer comprising an endless chain of temporary match holders 51 adapted to be supplied at one end of the upper horizontal run of the conveyer with matches from a suitable source of match supply, such, for example, as a match making machine, as indicated in Figs. 1, 2 and 3.

The conveyer chain passes around suitably-disposed sprocket wheels 52, 53 located respectively adjacent the match machine and a long table 54 which is supported by a substantial frame 55 at right angles to the upper run of the chain, and at a suitable distance from the match machine. The shaft 56 of the wheel 52 has its bearings in a shelf 57 extending from the match machine frame 58, and the shaft 59 of the wheel 53 has its bearings in a bracket 60 on the underside of the table 54 and is intermittently rotated, as will presently appear.

Each of the links of the conveyer 50 is provided on its outer face with a cross plate or blade 61, the blades of the adjacent links being arranged in spaced parallel relation, and affording, with the tops of the links, partitioned temporary holders for the reception of matches extending in substantial parallelism transversely of the links with the match heads pointing in the same direction. In the present instance each temporary match holder occupies a space substantially equal in length to the interior of the tray of an ordinary match box, and the distance between adjacent partition plates is less than the length of a match, thus obviating any liability of the contained matches being accidentally positioned lengthwise of the holder. The end walls of the adjoining temporary holders are spaced from each other as shown.

The upper run of the conveyer 50 in its travel between the match machine and the table 54 is supported by a stationary horizontal trough 62 whereof the floor comprises spaced parallel bars 63 having guide tongues 64 on their inner faces adapted to receive longitudinal grooves formed in the sides of the respective links of the conveyer. (See Fig. 14.)

This trough is in alignment with and constitutes, in effect, a continuation of a vibratory trough 65 which, extending across the end of the match machine, supports the receiving portion of the upper run of the conveyer 50 in the path of the matches that are ejected row by row from the match carrier 66 of the match machine by the punches 67 of the reciprocating punch head 68. (See Figs. 1, 2 and 3.) Hence when each succeeding series of temporary holders are positioned in the trough 65 and halted a suitable interval of time each of such holders is supplied with a predetermined quantity of matches from the match machine, and owing to the vibration of the trough the matches are caused to settle in parallelism within the respective holders.

In the present instance the conveyer 50 is intermittently driven, as hereinafter described, in order to present a series of three temporary match holders to the path of the matches discharged from the match machine during each succeeding dwell of the conveyer, and the discharge of the matches from the match carrier is effected only during the intervals of rest of the conveyer. Consequently the match machine, (or other source of match supply) is designed to deliver predetermined quantities of matches in timed relation to the intermittent travel of the conveyer 50. In an application filed simultaneously herewith, under Serial No. 446,714, I have disclosed a match machine especially adapted to be used in connection with the present packing machine.

The form of trough 65 herein illustrated comprises a bottom 670 and side walls 680, the latter having adjacent the bottom longitudinal guide tongues 69 which receive the lateral grooves of the respective links of the conveyer 50. One end of the trough 65 is supported by a vibratory arm 70 which is pivoted, as at 71, on the shelf 57. The other end of the trough 65 has affixed thereto a pendant bracket 72 which is hingedly connected by a pin 73 to the free end of an arm 74 pivotally supported, as at 75, on the shelf. The pin 73 carries a roll 76 which rests on a suitable cam 77 having alternate peripheral elevations and depressions, whereby during the rotation of the cam the roll 76 is actuated in a manner to impart short rapid vertical vibrations to the trough 65 and the associated temporary holders. The cam 77 is fast on a shaft 78 equipped with a pulley 79 which is connected by means of a belt 80 with a pulley 81 on a continuously driven stud shaft 82 of the match machine.

The upper surface of the table 54 is at a lower level than that of the trough 62, and the supporting frame for the table is provided with suitable bearings 83 for a power-driven shaft 84 which extends longitudinally and laterally of the table.

When the conveyer 50 is associated with a match making machine the power is transmitted to the shaft 84 through suitable reduction gearing from the main shaft 85 of the match machine. To this end the shaft 85 has coupled thereto, by means of an ordinary clutch 86, an extension 87 which may be rendered active or idle, as desired, by proper manipulation of the clutch during the operation of the match machine. The outer extremity of the shaft extension 87 has fast thereon a gear 88 in mesh with a gear 89 on the shaft 90 of a worm 91 which, in turn, meshes with a worm wheel 92 fast on the shaft 84; the ratio of the gearing being such that when the extension 87 is coupled to the shaft 85 the shaft 84 is rotated in the proper direction and in timed relation to the speed of the match machine. (See Figs. 1, 5 and 12).

The shaft 84 is operatively geared with the shaft 59 to effect the requisite intermittent rotation of the latter shaft and its sprocket wheel 53, thereby correspondingly actuating the conveyer 50. In the present instance the shaft 59 has fixed thereon a bevel gear 93 in mesh with a bevel gear 94 fast on a vertical shaft 95 journaled in a bearing 96 on the underside of the table. On the lower end of the vertical shaft 95 is a pin wheel 97 whereof the pins co-act with a cam 98 fast on the shaft 84; the contour of the cam surface and the ratio of the gearing being such that during each movement of the pin wheel the conveyer 50 is advanced a distance of three temporary holders and temporarily locked at the end of the step. As the chain intermittently progresses the filled holders are advanced to the end of the trough 62 remote from the match machine, and the matches which are contained in each succeeding series of temporary holders are ejected from such holders into a corresponding series of suitably located box trays (T) borne by a multi-row tray conveyer 99 extending at right angles to and below the chain of temporary holders.

The walls of the trough 62 terminate short of the conveyer 99 so that the contents of each succeeding series of holders can be bodily moved to and beyond one side or the other of the trough and deposited in the trays, as will be hereinafter described.

In the present instance the tray conveyer 99 comprises three corresponding endless chains arranged in juxtaposition and having their respective links in transverse alignment and hingedly connected by cross-rods 100 to afford a unitary chain structure.

The respective chains are in spaced parallel relation, and are so arranged that their upper runs travel in proximity to the underside of the table 54, which latter is provided directly above the respective chains with parallel longitudinal slots 101 for the free passage of the stems 102 of up-standing independently rotatable tray-holders 103 which are carried by the chains, as will presently be described.

The pivotal cross-rods 100 of the chains travel upon and are supported by pairs of sprocket wheels 104, 105 fast on shafts 106, 107, respectively, which are journaled in suitably-located bearings 108 on the framework below the table. The shaft 107 remote from the tray filling station is equipped with a pin wheel 109 with which co-acts a cam 110 on the longitudinally extending power-driven shaft 84, the contour of the cam being such that the tray conveyer 99 is actuated in timed relation to the match conveyer, that is to say, during each three-link step of the match conveyer the tray-conveyer is moved the distance of one link or tray-holder, thus positioning three trays to receive the contents of a corresponding number of temporary match holders during each coincident dwell of the match and tray conveyers. (See Fig. 11).

Each of the tray holders 103 comprises a body having a bottom 111 and two up-standing side walls, the latter being spaced to receive and hold between them an ordinary match box tray. The bottom is provided with the stem 102 which is rotatably mounted in a chain link, and the stem has fast thereon a gear 113 that rests on the link. The members of the succeeding tray holders of each chain are so arranged that as the upper run of the chain passes to and along the underside of the table, their respective gears travel in a longitudinal slot of the table and the bottoms 111 rest upon and are supported by the top of the table, and the succeeding holders are so spaced that during each interval of rest of the tray conveyer, a row of three trays is located below and adjacent each side of the bottom of the trough 62 and a corresponding row is positioned directly beneath the bottom, as seen in Fig. 14. The function of the gears and rotatable holders will hereinafter appear.

Any suitable means for supplying box trays to the holders of the respective chains of the conveyer 99 may be employed. The means herein illustrated is as follows reference being had more especially to Figs. 6, 32 and 39:

Adjacent the end of the tray conveyer 99 remote from the match conveyer 50 are three spaced-apart up-standing magazines 114 whereof the lower ends are in close relation to the paths of the respective chains of tray holders. Each magazine is of proper size and cross-section to receive and guide a single stack of box trays T placed one upon another with their sides in contact, and their bottoms located at the side of the magazine adjacent the chain. The bottom of each magazine is supported upon a cross-bar 115 on the frame 55, and the lower portion of the inner wall of the magazine is formed with an appropriate tray discharge opening 116, with which each succeeding tray holder aligns during each interval of rest of the tray conveyer, thus permitting each lowermost tray to be bodily pushed from the magazine into the aligning holder.

A series of reciprocative blocks 117 are arranged to move into and from the lower ends of the respective magazines through suitable openings 118 in the outer walls of the magazines, in a manner to engage the lowermost trays and transfer them to the adjacent row of holders of the conveyer 99. The blocks are pivotally supported at their outer ends by a corresponding series of up-standing rock arms 119 which are fast on a transverse rock-shaft 120 having its bearing in brackets 121 on the bed 122 of the supporting frame 55. The inner end of each block rests yieldingly on the bottom 123 of the adjacent magazine, so as to bear squarely against the opposing tray in the magazine.

Fast on one end of the rock-shaft 120 is an up-standing arm 124 having at its upper end a roll 125 which runs in the circumferential groove of a cam 126 fast on the main shaft 84. The contour of the cam groove is such that as each succeeding transverse row of tray holders is presented to the magazines, the arm 124 is quickly oscillated in a manner to effect corresponding motion of the arms 119 and their respective blocks 117, which latter in their inward stroke enter the magazines and seat the opposing trays in the holders, and in their outer stroke clear the outer walls of the magazines to permit the respective stacks of trays to descend and seat their lowermost trays in the path of the blocks preparatory to the next succeeding inward stroke of the blocks, and so on.

In each succeeding step of the tray conveyer 99 the tray holders supplied with trays are carried downward and along with the lower runs of the conveyer, thence around the sprocket wheels 104 adjacent the tray filling station, thence along with the upper runs of the conveyer and under the match conveyer trough 62. Suitable guard strips 620, which are supported adjacent and longitudinally of the paths of the respective chains of tray holders, serve to prevent displacement of the trays in the inverted holders during their travel from the tray supplying station to the upper horizontal level where the holders and their contained trays are brought to up-standing position.

Fixed on the table 54 so as to extend into and longitudinally of the respective slots 101, are rack bars 127, with the teeth of which the adjacent pinions 113 on the transverse rows of tray holders co-act during the intermittent travel of the tray conveyer. (See Figs. 14 and 18). The ratio of the pinion and rack gearing is such that in the travel of a transverse row of holders with their pinions in mesh with the respective racks, the pinions and therewith the holders are each turned a semi-rotation. Hence if the trays in each transverse row of holders, when they are positioned at one side of the trough 62, are supplied from a group of temporary holders with a partial charge of matches having their heads pointing in one direction, and such trays are advanced and partially rotated as they progress to the other side of the trough, the heads of the contained matches point in the opposite direction. This done, if the partially filled trays are supplied with another partial charge of matches from a succeeding group of temporary holders, the heads of the second charge are reversed in respect to those of the first charge. Therefore each tray of the transverse row is charged with matches whereof the heads of the upper and lower layers point in opposite directions to each other, thus ensuring a compact and uniform "fill".

The matches are removed from each succeeding group of temporary holders 51 and transferred to the transverse row of box trays at one side or the other of the trough 62, by means of a transfer head which reciprocates across the floor of the trough and sweeps through the holders; that is to say, in one stroke of the head it pushes the opposing matches endwise from one group of temporary holders and beyond one open side of the trough, and in the next succeeding stroke it pushes the then opposing matches endwise from the next succeeding group of temporary holders and beyond the other open side of the trough. In the present instance the transfer head comprises a bar 128 which extends above and longitudinally of the space occupied by the three temporary holders when they are at rest at the discharging end of the trough 62. Fixed to the respective sides of the bar are depending wiper plates 129 which are slotted, as at 130, to escape the partitions of the temporary holders during the reciprocation of the plates transversely of the holders. (See Figs. 6, 9, 13, 14 and 20). The ends of the bar are secured to blocks 131 which are slidably mounted on a pair of parallel guide rods 132 supported by suitable standards 133 on the table 54, the tops of each pair of standards being tied by tie bars 134. The blocks 131 are provided in their upper surfaces with rack teeth 135 which mesh with a pair of sector gears 136 fast on a transverse rock-shaft 137 which has its bearings in brackets 138 affixed to the respective tie bars 134. Fast on one end of the rock-shaft 137 is a gear 139 in mesh with a vertically-reciprocating rack 140 which is fitted in a suitable guide 141 rising from the table.

The lower end of the rack is jointed to the free end of a rock-arm 142 which is pivoted, as at 143, on a bracket 144 depending from the adjacent end of the table 54, and which arm is provided with a roll 145 adapted to run in the groove of a face cam 146 on the main shaft 84. The contour of the cam groove is such that in each semi-rotation of the cam 146 the rock-shaft is quickly actuated in a manner to lower the arm 142 as the cam approaches the limit of the succeeding semi-rotation, and so on. In each movement of the arm the rack 140 is raised or lowered, thereby partially rotating the sector gears 136 through the intervening mechanism, and in consequence effecting the timely reciprocation of the transfer head transversely of the trough 62. In each rapid transverse stroke of the head the opposing matches are swept from the temporary holders and beyond one side of the trough directly over the underlying box trays into which they bodily fall in substantial parallelism.

Suitable guards 147, 148 are positioned directly above and in line with the outer walls of the box trays at the respective sides of the trough 62 so as to lie in the path of the leading ends of the matches when the latter are projected beyond the open sides of the trough, thus limiting the outward movement of the matches to locations directly above the respective trays preparatory to their bodily descent into the trays. The guard 147 at the forward side of the trough comprises vertical plates depending from cross-bars 448 which are supported, preferably pivotally, on brackets 149 rising from the table 54, and the guard 148 at the other side of the trough comprises depending plates which are secured to a rock-shaft 150 mounted in brackets 151 also rising from the table.

One end of the rock-shaft 150 extends outwardly toward the main shaft 84 and is provided with a pinion 152 in mesh with a vertically reciprocative rack 153. The lower end of this rack is jointed to one arm 154 of a lever fulcrumed on a suitably-disposed bracket 155, the other arm 156 of the lever being connected by a link 157 with the free end of a rock-arm 158 which is pivoted to a suitably-disposed bracket 159 under the table 54. This rock-arm 158 has a roll 160 which runs in the groove of a face-cam 161 fast on the main shaft 84, said groove being so formed that in each semi-rotation of the cam it raises the rock-arm 158 and maintains it elevated, and then lowers the arm and so retains it until the completion of the rotation. The motion is transmitted from the rock-arm to the rock shaft, through the described connections, thus effecting the swinging of the guard plates 148 away from the tops of the adjacent filled trays upon the initial onward movement of the latter, and thereafter returning the plates to vertical position in relation to the leading walls of the next succeeding trays. The purpose of swinging the plates 148 away from the advancing filled trays is to obviate any liability of the upper match contents, or any of them, encountering the lower edges of the plates and being thereby displaced and swept from the trays.

Simple and effective means to settle the matches in parallelism in the two transverse rows of charged and partially charged trays adjacent the respective open sides of the trough, preparatory to each succeeding step of the tray conveyer, comprises two sets of spaced vibratory arms 162 terminating in heads 163 which by actuation of the arms are caused to enter the respective trays and rest upon the top rows of matches contained in the trays, and are then raised above the path of the trays to permit the succeeding movement of the conveyer with the trays.

In the present illustration there are three arms 162 in each set, which arms are of relatively light material of goose-neck formation affixed at their outer ends to a transverse rockshaft 164 having its bearings in brackets 165 on the table 54, and having capacity for slight vibration longitudinally of the axis of the shaft. These arms overhang the adjacent guard plates in the vicinity of the trays to be filled and depend toward such trays, so that the heads 163 at the free ends of the arms are movable into and above the trays when the trays have been supplied with matches from a series of temporary holders of the match conveyer 50, as previously mentioned.

Each of the heads 163 comprises a crosspiece preferably formed integral with the arm, and parallel plates 166 loosely supported on the respective sides of the cross-piece, which plates depend below the cross-piece and are roughened or serrated, as at 167, along their lower edges, as seen in Fig. 22. The plates 166 are formed with longitudinal slots 168 through which freely extend threaded studs 169 on the cross-piece, such studs being provided with suitable means, as nuts, to maintain the plates in place. Thus each of the plates has capacity for independent vertical and horizontal motion relatively to the cross-piece, and in consequence the two plates, when they are caused to rest upon and transversely of the tops of the matches contained in a tray, exert a straightening and settling effect on the matches by virtue of the vibration imparted to the plates through the medium of the shaft 164 and the arms 162.

The two shafts 164 for the respective sets of arms 162 are simultaneously vibrated longitudinally of their axes through suitable connections with a light electric motor 170. In the present instance these connections include a pair of spaced depending arms 171 which are secured to a rock-shaft 172 having its bearings in brackets 173 rising from the table at one side of the machine. These arms are connected to the adjacent ends of the shafts 164 by ball and socket joint members 174. The shaft 172 is provided near one end with a depending arm 175 which is pivotally connected by means of a rod 176 with a small eccentric head 177 on the motor shaft. Hence during the operation of the motor the shaft 172 is rapidly oscillated, and the two shafts 164 are vibrated longitudinally of their axes.

As a means to impart short rapid vertical vibrations to the arms 162 and their heads 163 while the heads are resting on the matches, thus contributing to the efficient straightening and settling of the matches, and also to lift the respective sets of arms to position their heads above the path of travel of the trays after the straightening and settling of the matches has been effected, I provide each of the shafts 164, adjacent its jointed end, with a pinion 178 which is splined or otherwise slidably connected to the shaft, the pinion being held against lateral displacement by means, for example, of yoke arms 179 extending from the adjacent bracket 165 and engaging a circumferential groove in the hub of the pinion 178. (See Fig. 18). One of the pinions 178 meshes with an adjacent idler 180, which idler and the other pinion 178 meshes with a rack-bar 181, and hence when the latter pinion is oscillated motion is transmitted to the idler and thence to the adjacent pinion, thus simultaneously rocking the two shafts 164. (See Figs. 14 and 20). The rack-bar 181 is slidably fitted in overlying guides 182 formed on or secured to the adjacent tie-bar 134, previously referred to.

One of the pinions 178 meshes with a vertical rack-bar 183, the lower end of which is joined to a rock-arm 184 pivoted on a bracket 185 depending from the table 54. This rock-arm has a lateral roll 186 which runs in the groove of a cam 187 fast on the main shaft 84, said groove being of such contour that at proper intervals in the rotation of the cam the rock-arm is fully raised or lowered, thereby correspondingly moving the rack-bar 181 and effecting the partial rotation of the pinions and of the longitudinally vibrating shafts 164 in a manner to raise or lower the arms 162. The portions of the walls of the cam groove with which the roll co-acts when the arms 162 are in down position with their heads resting on the matches, are scalloped, as at 188, thus imparting a succession of jarring effects to the arms and their heads for the purpose aforementioned. (See Fig. 9).

From the foregoing described construction and operation it will be seen that as each succeeding transverse series of trays progress from the region of the trough 62 such trays contain uniform charges of matches, whereof each charge comprises upper and lower layers having their respective heads pointing in opposite directions. The filled trays borne by the holders of the respective chains of the conveyer 99 are transported to a location where they are transferred in an orderly manner from their respective holders to the up-standing holders 189 of a single-row tray conveyer 190 which extends laterally of and parallel with the multi-row tray conveyer 99; it being noted that the upper surface of the table 54 is on the same horizontal level as the floors of the holders of the respective conveyers. This level is preferably provided by suitably-disposed longitudinal metal strips 191 which are affixed to the top of the table in the spaces between the adjacent longitudinal rows of up-standing tray holders.

The conveyer 190 comprises an endless chain of links supported beneath the table with the upper run of the chain travelling in close relation to the underside of the table. The table is slotted longitudinally, as at 192, for the free passage of bottom blocks 193 on the tray-holders 189, which blocks are fixed to and carried by the respective links of the conveyer 190. The tray holders 189 correspond in size and spaced relation with the holders 103 of the multi-row tray conveyer, the holders in the adjacent upper runs of the two conveyers being at the same level and in horizontal alignment with each other.

In the present instance the conveyer chain 190 passes about a pair of sprocket wheels 194 loosely mounted on a cross-shaft 195 having its bearings 196 in the frame 55, forwardly of the intermittently-driven cross-shaft 107, and also passes about a pair of similar wheels 197 fixed on a transverse shaft 198 having its bearings 199 at the rear of the frame 55. One of the wheels 197 is formed with a bevel gear face 200 which meshes with a gear 201 on one end of a longitudinal shaft 202 whereof the opposite end has fast thereon a bevel gear 203 in mesh with a gear 204 on the intermittently-driven shaft 107. By the gearing just described intermittent motion is transmitted from the shaft 107 to the conveyer 190, the ratio of the gearing being such that during each step movement of the conveyer 99 the conveyer 190 is moved a distance of three links. (See Figs. 4 and 11).

For convenience of reference hereinafter the three chains of the multi-row tray conveyer 99 are designated A, B, C, respectively.

A tray transfer device which is clearly shown in Figs. 6 and 23 to 28, inclusive, is constructed and adapted to reciprocate transversely of the upper run of the multi-row tray conveyer in timed relation to the intermittent movements of the later. This device includes a cross-head 205 having a series of pendant pushers 206 arranged in double step formation and adapted during each interval of rest of the tray conveyers to traverse the tray holders 103 of the respective chains of the conveyer 99 in a manner to shift the opposing filled trays in proper order from the holders of each chain to the holders of the adjacent chain, and, coincidentally, transfer a series of three spaced filled trays from the holders 103 of the chain C to the adjacent holders 189 of the conveyer 190. The series of filled trays transferred to the conveyer 190 are in such spaced relation that the next succeeding step of such conveyer positions a series of three empty holders 103 to receive a corresponding number of filled trays from the holders 189 of the chain C, during the next succeeding operation of the reciprocating transfer element, and so on, to the end that when the holders 189 of the conveyer 190 leave the region of the transfer device each of the succeeding holders 103 is supplied with a filled box tray.

The sequential operations of the tray transfer device and the holders of the respective tray conveyers are most clearly seen in Figs. 23, 24 and 25, wherein the transfer device embodies six pendant pushers 206 arranged in the order of one, two and three, the single pusher (a) being centrally of the transfer device to traverse one of the holders of the conveyor chain A; the two spaced pushers (b) being on the respective sides of the centre of the transfer device to traverse two spaced holders of the adjacent conveyer chain B, and the three spaced pushers (c) being so arranged that one traverses one of the holders of the adjacent conveyer chain C centrally of the transfer device and the others traverse two of said holders spaced from the respective sides of the center of said device and laterally beyond the paths of the pushers b.

In Fig. 23 the tray conveyers 99, 190 are represented as at rest and the reciprocating transfer device is indicated at the limit of its back stroke preparatory to acting upon the opposing trays in the adjacent holders of the respective chains A, B, C. In Fig. 24 the transfer device is represented at the limit of its forward stroke during the dwell of the conveyers, showing the trays as transferred by the respective pushers a, b, c; and in Fig. 25 the transfer device is represented at the limit of the next succeeding back stroke, the respective conveyers having been relatively advanced one step and another series of trays having been positioned in front of the respective pushers, preparatory to a repetition of the transfer operation previously described.

In the form illustrated, the cross-head of the transfer device comprises a suitable frame of light metal slidably mounted in parallel guide bars 207 on the table, so as to have capacity for vertical as well as horizontal movement. This frame is connected by means of a link 208 with an up-standing rock-arm 209 which is pivoted at its lower end to the bed of the supporting frame 55, and which arm has a roll 210 seated in the groove of a cam 211 fast on the main shaft 84. The contour of the cam groove is such that the cross-head 205 is reciprocated horizontally in timed relation to the intermittent travel of the tray conveyers.

The pendant pushers 206 are preferably separate members of hard metal fixedly secured to the cross-head to partake of its movements. In the present instance these members are fixed to rods 212 which are fastened in suitably-located lugs 213 on the cross-head, and which rods are each provided at one end with an anti-friction roll 214.

Overhanging the respective chains of tray holders 103 are three elongated vibratory cam arms 215 which are pivoted to up-standing brackets 216 on the table, the pivoted rear portions of the arms having shoulders or lugs 217 which co-act with stops 218 on the respective brackets to limit the downward movement of the arms yet permit their free upward swinging movement.

The arms 215 are formed with upper cam surfaces 219 the free ends of which incline or curve downwardly, as at 220, to extend normally below the paths of the respective rolls 214 when such rolls are moved forward by the cross-head, the under surfaces of the rearward portions of the arms being formed and positioned to lie above the paths of the rolls.

When the cross-head is at the limit of its back stroke the pushers 206 depend in the rear of the adjacent trays, as seen in Fig. 26, and hence in the forward stroke of the cross-head, the pushers impinge against and advance the opposing trays in the three chains of holders. As the cross-head approaches the limit of its forward stroke, as seen in Fig. 27, the rolls 214 bear against the downwardly curved portions of the respective arms 215, thus raising the arms and passing beyond their free ends. Thereupon such ends drop back of the rolls. Consequently in the succeeding back stroke of the cross-head the rolls ride upon the cam arms in a manner to raise the cross-head and lift the pushers above the path of the holders of the conveyer 99, thus permitting the pushers to escape the adjacent trays and their contents. As the cross-head approaches the limit of its back stroke, as seen in Fig. 28, the rolls reach the beveled rearward ends 221 of the cam surfaces of the respective arms and escape such surfaces, thus permitting the cross-head to descend and resume its normal down position in readiness for a succeeding forward stroke.

The filled trays borne by the succeeding holders of the intermittently travelling tray conveyer 190 are advanced to mechanism whereby so-called protection strips S for the top matches contained in the trays are formed and applied to each succeeding series of three trays. (See Figs. 29 to 39, inclusive).

This mechanism, in its preferred construction, includes a former frame 222 which is supported above and longitudinally of the path of the single-row tray conveyor 190 and is so located that in each dwell of the latter three trays are stationed thereunder. The former frame comprises parallel side rails 223 connected at one end by a cross-member 224 and at spaced intervals by cross-members 225 having rectangular former plates 226 each spaced at its ends and free edge from the adjacent side rails and cross-member of the former frame, and being of a width and a length equal to the corresponding dimensions of the body of a protection strip. The side rails of the former frame are secured to parallel guide bars 227 which are slidably fitted in longitudinal guides 228 on the table 54, whereby the former frame can be reciprocated to locate above the respective underlying trays the plates 226, or the adjacent spaces 229, as desired. (See Fig. 33). Any suitable means for actuating the former frame may be employed. In the present instance, the rear ends of the rails 223 are extended and provided with gear racks 230 with which mesh pinions 231 fast on a cross-shaft 232 having its bearings in suitably-disposed brackets 233. A vertically movable rack 234 meshes with one of the pinions and is jointed at its lower end, as at 235 (Fig. 39) to one arm 236 of a lever which is fulcrumed on a bracket 237 on the underside of the table. The other arm 238 of the lever is pivoted to the upper end of a vertically reciprocative bar 239 having a bifurcated lower portion which embraces the main shaft 84. This bar has a lateral roll 240 which runs in the groove of a face cam 241 fast on the shaft 84, said groove being of proper formation to reciprocate the bar and oscillate the lever in a manner to effect the reciprocation of the rack 234 and the actuation of the pinions 231, thus transmitting the periodical longitudinal movements to the former frame 222.

The protection-strip blanks comprise the leading end portions (Figs. 30, 31) of spaced-apart strips P (Fig. 33) of material of suitable width which are fed from rolls 242 mounted on independent shafts 243 having their bearings in pedestals 244 on a supplemental table 245 which is supported at its ends so as to extend above and transversely of the table 54. The supplemental table is provided with spaced pairs of parallel strips 246 which overhang and guide the edges of the respective strips of protection-cover stock. (See Figs. 29, 38). Each of the strips P is notched at regular intervals in its respective edges, as at p, to provide a succession of connected protection-strip blanks, whereof the leading blanks may be simultaneously fed to and positioned on the respective former plates 226 and above and transversely of the path of travel of the trays by the agency of two sets of feed rolls 247 between which the material extends. These feed rolls, of which there are a pair of each strip of material, are fast on upper and lower parallel shafts 248, 249, respectively, extending transversely of the path of such strips and having their bearings in suitably-disposed boxes 250 on the table 54. The two shafts have fast thereon, at one end, meshing gears 251. Loose on the lower shaft 249, at the opposite end, is a pinion 252 having a suitable one-way clutch connection with the shaft, whereby when the gear 252 is rotated in one direction, namely, to impart a feeding motion to the rolls, the shaft 249 is actuated, but when the pinion 252 is moved in the opposite direction it turns idly on the shaft. In the present instance is employed an ordinary one-way clutch comprising a head 253 fast on the shaft 249 and having a plurality of inclined peripheral pockets 254; a cylindrical casing 255 affixed to the pinion 252 and also loose on the shaft and head, and clutch rollers 256 supported in the pockets of the head and in rolling contact with the inner peripheral surface of the casing.

The pinion 252 meshes with a vertical rack 257 whereof the lower end is jointed to one arm 258 of a horizontal lever which is fulcrumed, as at 259, on a bracket on the underside of the table 54. The other arm 260 of this lever is pivoted, as at 261, to a vertically reciprocative bar 262 having a depending bifurcated portion 263 which embraces the main shaft 84. The bar 262 is equipped with a lateral roll 264 which runs in the groove of a face cam 265 fast on the main shaft, such groove being properly formed to effect the periodical reciprocation of the bar and the oscillation of the horizontal lever, thereby reciprocating the rack 257 and oscillating the pinion 252 in a manner to actuate the feed rolls 247 and effect the feeding thereby of the respective strips of material P a distance equal to the length of a protection-strip.

In order to ensure the accurate feeding of the strips of material they are formed with properly spaced apertures $x$, and each of the upper rolls 247 is provided with a suitably disposed peripheral stud 266 which is arranged and adapted to register with each succeeding hole of the adjacent strip during each active or feeding movement of the feed rolls.

When the leading end portions of the strips of material have been advanced upon the respective former plates 226 and thereby supported above and transversely of the path of travel of the trays, pressure devices are caused to descend and bear upon the respective end portions of the strips, as will be presently described. At the same time, a series of pendant cutters which overhang the respective strips adjacent the inner rail of the former frame 222 are caused to descend upon the strips P and sever therefrom the free end portions, thus producing three protection strip blanks which rest upon the former plates.

The cutters each comprise a vertically-disposed knife 267 which is fixed at its upper end to a leaf plate 268 pivoted to the free end of a rock-arm 269. Each knife is slidable in a slot 270 in a stationary frame bar 271 which extends across the former, and has supporting feet 272 which are bolted to the adjacent guide members 228, a suitable guide space 273 for the passage of the strip web to the former being provided at the inner end of the bar 271. The guide member 227 adjacent the knife is formed with a knife guiding slot 274 in line with the slot 270 in the bar 271 and the inner wall of the portion of the former bar between the slots affords a lateral bearing surface for the reciprocating knife. This knife is held under lateral tension to reciprocate in frictional contact with the opposing surfaces, by means of a spring 275 which is secured to the leaf plate 268 and to a stud on the rear of the rock-arm 269. Thus the bevelled cutting edge of the knife is kept in sharpened condition.

The rear ends of the associated rock-arms 269 are fulcrumed on a transverse shaft 276 having its bearings in guide brackets 277 (hereinafter referred to) rising from the supplemental table 245. Fast on one end of the shaft 276 is a pinion 278 which meshes with a rack 279 on one end of a reciprocative bar 280 which is guided in a grooved bracket 281 at one side of the table 245. This bar extends toward the rear of the table 245 and is pivotally connected to one arm 381 of a bell-crank which extends through a slot 282 in the table 54 and is fulcrumed, as at 283, on the underside of the latter. The other arm 284 of the bell-crank is pivoted to the upper end of a vertical bar 285 which is bifurcated at its lower end, as at 286, to embrace the main shaft 84.

The bar 285 is provided with a lateral roll 287 which runs in the groove of a face cam 288 fast on the main shaft, the contour of the groove being such that at proper intervals the bar is reciprocated in a manner to oscillate the bell-crank and actuate the rack-bar. The rack-bar in its motion oscillates the pinion 278 and shaft 276, thereby lowering and raising the series of arms 269 and their cutter blades 267 in timed relation to the operation of the feed rolls 247.

The ends of the protection strip blanks which are imposed on the former plates 226 project beyond the ends of the respective plates, the pressure devices resting on the bodies of such blanks and maintaining them uniformly in place. (See Figs. 33 to 37, inclusively). Each of these devices comprises a plate 388 which is affixed to the lower ends of a pair of vertical rods 289. These rods are slidably fitted in a cross-piece 290 at the foot of a plunger 291 mounted in a guide casing 292, there being three casings supported in spaced relation to each other by brackets 293 rising from the frame bars 271 which span the former 222. (See Figs. 30, 31).

The vertical rods 289 of each pressure plate have adjustable stops, such as nuts 294, which are so arranged in relation to the top of the cross-piece 290 as to permit independent downward movement of the pressure plate when the plate rests upon the strip blank on the former.

Secured to the ends of each cross-piece 290 are a pair of depending blades 295 the lower ends of which are bevelled, and lie in close relation to the ends of the associated pressure plate 388; it being noted that the inner blade 295 is in spaced parallel relation to the adjacent cutter 267. Hence when the pressure plate rests on a strip blank, and the cross-piece is depressed a limited distance, the blades 295 bear upon the opposing projecting ends of the blank and bend them downward against the ends of the former plate and at right angles to the body of the blank, thus completing the protection strip. (See Fig. 36). In this bending operation, the pressure plate 388 rests upon and is supported by the body of the strip, and hence the cross-piece and its blades descend independently of such plate. The former 222 is then moved to the right, through the described gear and lever connections with the cam 241, thereby withdrawing the former plates 226 from under the respective protection strips and shifting the spaces 229 of the former immediately below the strips and directly above the three filled trays on the conveyer 190. The three protection strips are supported by the lateral pressure of their downwardly bent ends against the contiguous pairs of blades 295, the pressure plates 388 resting on the tops of the strips. Hence when the plungers are further depressed the blades of each cross-piece enter the underlying tray, adjacent the end walls of the latter, thus inserting the depending ends of the supported protection strip between the said walls and the contained matches, the pressure plate bearing upon the top of the strip and following it down until the body of the strip rests firmly upon the matches contained in the tray, thereby insuring the uniform placement of the strip on the matches. (See Fig. 37).

Preparatory to the next succeeding step of the conveyer, the plungers are lifted to raise the respective bending blades and associated pressure plates above the path of the former frame, in readiness for a succeeding operation upon the next series of protection strips, and so on. In the initial upward movement of each plunger the pressure plate bears on the opposing protection strip, thus preventing upward displacement of the strip.

In the present instance the means for actuating the plungers 291 in timed relation to the tray conveyer 190, and to the strip-feeding mechanism and the former 222 is as follows: Each of the plungers is provided with a gear rack 296 with which meshes a pinion 297 on the forward end of a transverse shaft 298 having its bearings in the lower portion of the adjacent plunger casing 292 and in a bracket 299 at the rear of the table 245. (See Figs. 29, 31 and 39). The three shafts 298 are geared together at their rear ends by means of a train of gears 300, and one of the shafts 298 has fast thereon a gear 301 by actuation of which the three shafts may be simultaneously rotated in the same direction, to the right or left, by means of the gear train. The gear 301 meshes with a vertical rack 302 which is guided in a suitably-located bracket 303 and is jointed, as at 304, at its lower end to a rock-arm 305 which is pivoted, at 306, to a depending bracket 307 on the table 54. The rock-arm 305 has a lateral roll 308 which runs in the groove of a face cam 309 fixed on the main shaft 84, the countour of the groove being such that the rock-arm is raised and lowered at proper intervals of time, thereby correspondingly actuating the vertical rack 302 to effect the oscillation of the gear 301 and the shafts 298 in such a manner that the gears 297 on the shafts 298 impart the requisite vertical movements to the racks 296 and the plungers 291.

The series of filled trays supplied with protection strips are advanced by the single-row tray conveyer 190 to a location where they are nested in a corresponding series of covers (K) borne by the holders 189 of a cover conveyer 310 which extends laterally of and parallel with the conveyer 190. (See Figs. 4, 6, 29, 31, 39, 40).

The cover conveyer 310 comprises an endless chain of links supported beneath the main table 54 with the upper run of the chain travelling in close relation to the underside of the table. The table is slotted longitudinally, as at 311, (Figs. 31, 40) for the free passage of the stems of the cover holders 312 which are fixed to and carried by the respective links of the chain. These cover holders are spaced correspondingly with the tray holders 189 of the conveyer 190, the holders in the adjacent upper runs of the two conveyers being at the same level and in endwise alignment with each other.

The cover conveyer 310 passes about a pair of sprocket wheels 313 loose on the shaft 107 and a pair of similar wheels 314 fast on the driven shaft 198, and in consequence the two conveyers 190, 310 are intermittently driven in the same direction and at the same speed. (See Fig. 11).

Any suitable means for supplying covers to the holders of the cover conveyer 310 may be employed. The means herein illustrated is as follows, reference being had to Figs. 4 and 6.

315 designates three spaced-apart upstanding magazines supported by suitably-disposed brackets 316 on the main table 54 and having open lower ends which overhang three adjacent holders 312 of the cover conveyer when such holders are at rest in front of the protection-strip applying mechanism during each dwell of the cover conveyer.

Each magazine is of proper size and cross-section to receive and guide a single stack of box covers K placed one upon another, the lowermost cover being adapted to drop by gravity into the holder 312 located thereunder.

The three covers borne by the cover conveyer 310 progress correspondingly with the adjacent series of filled trays borne by the single-row tray conveyer 190 to a position where the filled trays, during a dwell of the conveyers, are simultaneously moved endwise from the conveyer 190 and nested in the covers, as will presently be described.

To obviate any liability of the premature partial descent into the underlying empty cover holders of the lowermost covers contained in the magazines while the immediately preceding series of covers are being advanced by the cover conveyer, means are preferably provided to support such lowermost covers above the holders 312 until the step of the conveyer is completed. The means herein illustrated for this purpose comprises a vertical arm 317 rising from a rock-shaft 318 having its bearings in hangers 319 at the front of the framework in the vicinity of the magazines. This arm carries a T-head 320 which is disposed forwardly of the lower portions of the magazines and is provided with properly spaced spring-pressed heads 321 which by actuation of the arm are movable into and from apertures 322 in the adjacent walls of the respective magazines during each succeeding dwell of the cover conveyer. (See Figs. 4, 6 and 11).

In their inward movement the pressure heads bear resiliently against the opposing ends of the contiguous walls of the pairs of covers at the bottoms of the respective magazines, thereby pressing the opposite ends of the covers against the opposing walls of the magazines with sufficient yielding force to maintain the lowermost covers above the path of the cover holders 312 of the cover conveyer. In their outer movement the heads 321 free the clamped covers and permit their descent, thus enabling the lowermost covers to drop freely into the underlying series of holders of the cover conveyer.

In the present instance the rock-shaft 318 has fixed thereto a depending arm 323 which is jointed at its lower extremity to the forward end of a reciprocative rod 324 which extends transversely of the supporting frame and is slidably guided in the respective sides of the latter. The rear extremity of the rod 324 is provided with a roll 325 which is normally held in contact with the periphery of the adjacent cam 211 on the main shaft 84 by means of a spring 326 which, encircling the rod, bears at its respective ends against the frame 55 and a collar 327 on the rod. The cam 211 is provided with a circumferential cam ring 411 which at a predetermined time in the rotation of the cam, while the cover conveyer is at rest, acts against the roll 325 and forces the rod 324 forward against the pressure of the spring 326, thus effecting the clamping of the lower pairs of covers in the respective magazines by the action of the pressure heads. As the rotation of the cam 211 continues the cam ring 411 retains the rod in its forward condition during the step of the cover conveyer, and then, during the dwell of the conveyer, permits the rod to resume its rearward position and effect the release of the restrained covers, whereupon the lowermost covers drop into the underlying holders of the cover conveyer, as previously mentioned.

The preferred mechanism for nesting each succeeding series of filled trays in a corresponding series of covers borne by the cover conveyer includes a series of transversely reciprocative pushers arranged and adapted to bear against the rear ends of the opposing trays. (See Figs. 29, 40, 41, 42).

The pushers preferably comprise three spaced-apart parallel bars 328 which are slidably mounted on the table 54. These bars have formed in their under faces rack-teeth 329 which mesh with gears 330 on a transverse shaft 331 having its bearings in brackets 332 on the underside of the table 54, which table is slotted, as at 333, for the free passage of the respective gears. The frame is provided below the respective gears with hanger guides 334 in which are slidably fitted a series of rack-bars 335 which mesh with the adjacent gears 330. The rear ends of these rack-bars are connected by a rod 336 so as to be movable as a unit, which rod, in turn, is connected by means of a link 337 with the upper end of an upstanding rock-arm 338 which is fulcrumed on a bracket 339 on the frame bed 122. The rock-arm has a lateral roll 340 which runs in the groove of a cam 341 fast on the main shaft 84, the contour of the groove being such as to effect through the described rocker and link connections the timely reciprocation of the racks 335, which motion is transmitted through the gears 330 to the respective pusher bars 328. (See Fig. 40).

To ensure the proper entry of the leading ends of the filled trays into the respective covers, guide structures for the respective trays are mounted on the table between the two conveyers 190, 310. (See Figs. 6, 29, 40). Each of these structures comprises a rectangular casing 342 open at front and back, and properly formed interiorly to receive the advancing tray and guide it uniformly toward the opposing cover. The end of the casing 342 adjacent the cover conveyer, is provided with a series of forwardly projecting resilient lips 343 which are spaced and arranged to receive the sides and top of the adjacent cover if it is pushed toward the casing, thereby ensuring the alignment of the cover with its tray. In the present instance there are two lips at the respective sides of the casing and one at the top of the casing, each of which lips comprises a thin plate which is affixed to a leaf or arm 344 pivoted on the casing. A suitable spring 345 secured to the casing and bearing against the leaf yieldingly maintains the lip normally in the path of the cover.

The three covers are moved into engagement with the respective series of lips, and held therein during the forward or "nesting" stroke of the pushers, as follows:

346 designate a vertical lever fulcrumed, as at 347, on a hanger 348 at the front of the frame 55, the upper arm of which lever has a T-head 349 which, by actuation of the lever is movable against and from the opposing outer ends of the three covers K, the inward movement of the head shifting the covers into endwise engaging relation to the opposing lips 343. The lower arm of the lever 346 is jointed to the forward end of a reciprocative transverse rod 350 which is slidably mounted in the respective sides of the supporting frame. (See Fig. 40). The rear extremity of the rod has a roll 351 which is normally held in contact with the periphery of the cam 341 by means of a spring 352 which, encircling the rod, bears at its respective ends against the frame and a collar 353 on the rod. On the periphery of the cam 341 is a segment 354 which at predetermined intervals in the rotation of the cam impinges against the roll and moves the rod forward against the pressure of the spring, retaining the rod in that condition for the requisite interval and then permitting the rod to resume its normal position. When the rod is in its normal or retracted position the lever 346 is held with its T-head 349 outwardly of the adjacent ends of the covers, but when the rod is moved forward by the action of the cam the lever is actuated to swing its upper arm inwardly, thus causing the T-head 349 to push the respective covers toward the guide lips 343, as previously mentioned.

A means to avoid displacement of the match contents of the trays as they are being pushed forward into the respective guide casings 342 and the associated covers, comprises thin resilient blades 355 which are caused to bear upon the contents of the respective trays and also to move therewith into the casings and the covers. Each blade, which overhangs the adjacent pusher bar 328 and projects forwardly thereof, is secured at its rear to the free end of a vibratory arm 356 which is pivoted, as at 357, to the associated bar 328.

The arm 356 has a lateral roll 358 which, in the longitudinal reciprocation of the arm, rides on an up-standing cam-piece 359 fixed to the table 54. The upper surface of this cam-piece is so formed and located that when the bar is in its normal rearward position it maintains the roll and, perforce, the associated arm in raised position with the blade somewhat above the top of the adjacent tray, as seen in Fig. 40, but in the initial forward movement of the bar the roll rides down on the cam surface so as to lower the arm and permit the blade to drop upon the top of the adjacent filled tray. At the end of this initial movement the pusher impinges against the tray, and as the forward motion of the bar continues the blade bears upon the contents of the tray and moves therewith until the tray has been fully inserted in the complementary cover in the cover conveyer. When the bar is retracted, the roll rides upon the cam-piece and raises the arm and blade to their original position in readiness for a succeeding operation on the next following series of filled trays borne by the conveyer 190, and so on.

As the filled boxes, comprising the associated trays and covers, are carried by the conveyer 310 about the sprocket wheels 314 at the delivery end of the machine, such boxes encounter an inclined stripper 360 which removes the boxes successively from their respective holders 312. This stripper, which is secured to the adjacent side of the supporting frame, leads to a transverse take-off belt 361 which receives the boxes of matches and carries them to a suitable point of discharge. The belt 361 passes about suitable pulleys, one of which is indicated at 362. The shaft 363 of this pulley is journaled in suitably-disposed bearings and provided with a bevel gear 364 which meshes with a similar gear 365 on the adjacent end of a cross-shaft 366 having its bearings in pedestals 367 on the frame bed 122. The rear end of the shaft 366 is provided with a bevel gear 368 which meshes with a similar gear 369 on the main shaft 84. By the described gearing the take-off belt is continuously driven from the main shaft in the direction indicated in Fig. 7.

It is to be understood that my invention is not limited to the particular exemplifying construction herein disclosed, as the mechanisms may be modified within the principle of the invention and the scope of the appended claims.

I claim—

1. In a machine for packing matches, the combination of means for advancing a succession of segregated groups of matches in a horizontal path, means for advancing box trays from one side to the other side of said path, and means for moving succeeding groups of matches beyond the respective sides of said path in alternation, whereby the said matches are delivered alternately to the trays positioned at the respective sides of said path.

2. In a machine for packing matches, the combination of means for advancing a succession of segregated groups of matches in a horizontal path, means for advancing box trays from one side to the other side of said path, means for moving succeeding groups of matches beyond the respective sides of said path in alternation, whereby the said matches are delivered alternately to the trays positioned at the respective sides of said path, and means for partially turning said trays as they progress from side to side of said path.

3. In a machine for packing matches, the combination of means for advancing a succession of segregated groups of matches in a horizontal path, means for advancing box trays below and transversely of the said path, and means for moving groups of matches beyond the respective sides of the said path in alternation, whereby the said matches are delivered alternately to the trays positioned at the respective sides of said path.

4. In a machine for packing matches, the combination of means for advancing a succession of segregated groups of matches in a horizontal path, means for advancing box trays below and transversely of the said path, means for moving groups of matches beyond the respective sides of the said path in alternation, whereby the said matches are delivered alternately to the trays positioned at the respective sides of said path, and means for partially turning said trays as they progress from side to side of said path.

5. In a machine for packing matches, the combination of means for advancing a succession of segregated groups of matches in a horizontal path, means for advancing box trays below and transversely of the said path, and means, including a head reciprocative transversely of said path for moving groups of matches beyond the respective sides of the path in alternation, whereby the said matches are delivered alternately to the trays positioned at the respective sides of said path.

6. In a machine for packing matches, the combination of an endless match conveyer constructed and adapted to advance a succession of segregated groups of matches to a transfer station, an endless tray conveyer constructed and arranged to advance box trays to said station in such manner that the trays progress from one side to the other of the match conveyer, and means for transferring matches endwise in one direction from the match conveyer to the trays positioned adjacent one side of the match conveyer and thereafter transferring matches endwise in the opposite direction from the match conveyer to the trays when they are positioned at the other side of the first-named conveyer.

7. In a machine for packing matches, the combination of an endless match conveyer constructed and adapted to advance a succession of segregated groups of matches to a transfer station, an endless tray conveyer constructed and arranged to advance box trays to said station in such manner that the trays progress from one side to the other of the match conveyer, means for transferring matches endwise in one direction from the match conveyer to the trays positioned adjacent one side of the match conveyer and thereafter transferring matches endwise in the opposite direction from the match conveyer to the trays when they are positioned at the other side of the first-named conveyer, and means for partially turning said trays as they progress from side to side of the first-named conveyer.

8. In a machine for packing matches, the combination of an endless match conveyer having a succession of temporary holders for matches, means for moving said conveyer step-by-step, each step corresponding with the space occupied by a series of match holders, an endless tray conveyer arranged to travel below and transversely of the match holders and having holders for a succession of transverse rows of trays, whereof the tray holders of each row are spaced correspondingly with a series of match holders, means for moving said tray conveyer step-by-step to position a row of tray holders in proximity to each succeeding series of match holders, and means for transferring the matches from each succeeding series of match holders to each succeeding row of trays adjacent thereto.

9. In a machine for packing matches, the combination of an endless match conveyer having a succession of temporary holders for matches, means for moving said conveyer step-by-step, each step corresponding with the space occupied by a series of match holders, an endless tray conveyer arranged to travel below and transversely of the match holders and having holders for a succession of transverse rows of trays, whereof the tray holders of each row are spaced correspondingly with a series of match holders, means for moving said tray conveyer step-by-step to position a row of tray holders in proximity to each succeeding series of match holders, match transfer means reciprocative transversely of the path of the match holders and operative in one stroke of each reciprocation to sweep the matches from a series of match holders to a row of trays in the tray conveyer and in the next succeeding stroke to sweep the matches from another series of match holders to a row of trays in the tray conveyer, and means for actuating said transfer means in timed relation to the travel of the respective conveyers.

10. In a machine for packing matches, the combination of an endless match conveyer having a succession of temporary holders for matches, means for moving said conveyer step-by-step, each step corresponding with the space occupied by a series of match holders, an endless tray conveyer arranged to travel below and transversely of the match holders and having holders for a succession of transverse rows of trays, whereof the tray holders of each row are spaced correspondingly with a series of match holders, means for moving said tray conveyer step-by-step to position a row of tray holders in proximity to each succeeding series of match holders, match transfer means reciprocative transversely of the path of the match holders and operative in one stroke of each reciprocation to sweep the matches from a series of match holders to a row of trays in the tray conveyer and in the next succeeding stroke to sweep the matches from another series of match holders to a row of trays in the tray conveyer, means for actuating said transfer means in timed relation to the travel of the respective conveyers, and means for partially turning the tray holders of each succeeding row during their travel beneath the match conveyer.

11. In a machine for packing matches, the combination of an endless match conveyer having a succession of temporary holders for matches, means for moving said conveyer step-by-step, each step corresponding with the space occupied by a series of match holders, means for supplying matches to such series of match holders during each dwell of the conveyer, an endless tray conveyer arranged to travel below and transversely of the match holders and having holders for a succession of transverse rows of trays, whereof the tray holders of each row are spaced correspondingly with a series of match holders, means for moving said tray conveyer step-by-step to position a row of tray holders in proximity to each succeeding series of match holders, and means for transferring the matches from each succeeding series of match holders to each succeeding row of trays adjacent thereto.

12. In a machine for packing matches, the combination of means for advancing a succession of segregated groups of matches in a horizontal path, means for advancing a succession of box trays below and transversely of the said path, means for ejecting groups of matches laterally of the said path, and a pendant guard member arranged above the path of the trays and in the path of the leading ends of the ejected matches.

13. In a machine for packing matches, the combination of means for advancing a succession of segregated groups of matches in a horizontal path, means for advancing a succession of box trays below and transversely of the said path, means for ejecting groups of matches laterally of the said path, a pendant vibratory guard member arranged above the path of the trays and in the path of the leading ends of the projected matches, and means for vibrating said guard member after each tray has been supplied with matches.

14. In a machine for packing matches, the combination of means for advancing a succession of segregated groups of matches in a horizontal path, means for advancing a succession of box trays below and transversely of the said path, means for moving groups of matches beyond the respective sides of said path in alternation, whereby the said matches are delivered alternately to the trays positioned at the respective sides of said path, pendant guard members arranged above the path of the trays at the respective sides of said path, and means for vibrating the rearward guard member after each tray adjacent thereto has been supplied with matches.

15. In a machine for packing matches, the combination of means for advancing a succession of segregated groups of matches in a horizontal path, means for advancing box trays from one side to the other of said path, means for moving succeeding groups of matches beyond the respective sides of said path in alternation, whereby the said matches are delivered alternately to the trays positioned at the respective sides of said path, means for partially turning said trays as they progress from side to side of the path, and means for settling and parallelizing the matches within the trays at the respective sides of the said path.

16. In a machine for packing matches, the combination of a tray conveyer constructed and adapted to receive and carry transverse rows of box trays, means for supplying trays to said conveyer, a second tray conveyer arranged to travel adjacent to and parallel with the first-named conveyer and constructed to receive and carry a succession of single trays, means for concurrently moving said conveyers, and means whereby the trays of predetermined leading rows in the first-named conveyer are progressively moved in step-like formation toward the second conveyer and at the same time spaced-apart trays in the first-named conveyer are moved into the second conveyer, the sequence of operations being such that the trays of the leading rows in the first-named conveyer are ultimately positioned in a single longitudinal row in the second-named conveyer.

17. In a machine for packing matches, the combination of a tray conveyer constructed and adapted to receive and carry transverse rows of box trays, means for supplying trays to said conveyer, a second tray conveyer arranged to travel adjacent to and parallel with the first-named conveyer and constructed to receive and carry a succession of single trays, means for concurrently moving said conveyers, a tray transfer element reciprocative transversely of the first-named conveyer and having pusher elements arranged in step-like formation whereby the trays of predetermined leading rows in the first-named conveyer are progressively moved in step-like formation toward the second conveyer and at the same time spaced-apart trays in the first-named conveyer are moved into the second conveyer, and means for reciprocating said transfer element in timed relation to the travel of the two conveyers.

18. In a machine for packing matches, the combination of a tray conveyer constructed and adapted to receive and carry transverse rows of box trays, means for supplying trays to said conveyer, a second tray conveyer arranged to travel adjacent to and parallel with the first-named conveyer and constructed to receive and carry a succession of single trays, means for concurrently moving said conveyers, a tray transfer element reciprocative transversely of the first-named conveyer and comprising a cross-head, pendant pushers arranged in step-like formation on said head, and means whereby said pushers are periodically raised and lowered in respect to the opposing trays in the first-named conveyer during the reciprocation of the cross-head.

19. In a machine for packing matches, the combination of a conveyer comprising a plurality of chains of tray holders arranged in spaced parallel relation and each constructed and adapted to carry a succession of trays, means for supplying trays to the tray holders of the respective chains, a bed affording supporting surfaces in alternation with the respective chains, a second tray conveyer arranged to travel adjacent to and parallel with one of the outer chains of tray holders and constructed to receive and carry a succession of single trays, means for concurrently moving said conveyers, and means whereby predetermined trays are progressively moved from the tray holders of each chain to the tray holders of the adjacent chain in step-like formation and at the same time spaced-apart trays in the chain of holders adjacent the second conveyer are moved into the latter conveyer.

20. In a machine for packing matches, a combination with means for feeding filled box trays, of a former element for protection strips overlying the path of said trays, means for reciprocating said element longitudinally of the said path to move the element respectively into and from a position directly above a tray, means for supplying a strip of material with openings spaced a predetermined distance apart, means for feeding upon said former element said strip of material and for engaging said perforations to position the strip, a vertically reciprocative head, including spaced depending members, operative in the initial movement of the head, when the former element is in one position, to engage the projecting ends of the said strip and bend them downward, and in the farther descent of the head, when the former element is in the other position, to depress the said strip and insert its ends between the matches and the adjacent end walls of the tray, and means for actuating said head in timed relation to the former element and the tray feeding means.

21. In a machine for packing matches, the combination with means for feeding filled box trays, of a former element for protection strips overlying the path of said trays, means for reciprocating said element longitudinally of the said path to move the element respectively into and from a position directly above a tray, means for supplying a strip of material with openings spaced a predetermined distance apart, means for feeding upon said former element said strip of material and for engaging said perforations to position the strip, a vertically reciprocative head, including spaced depending members, operative in the initial movement of the head, when the former element is in one position, to engage the ends of the said strip and bend them downward, and in the farther descent of the head, when the former element is in the other position, to depress the said strip and insert its ends between the matches and the adjacent end walls of the tray, a stripper member interposed between and vertically movable with and independently of said depending members, and means for actuating said head in timed relation to the former element and the tray feeding means.

22. In a machine for packing matches, the combination with means for feeding filled box trays, of a former element for protection strips overlying the path of said trays, means for reciprocating said element longitudinally of said path to move the element respectively into and from a position directly above a tray, means for intermittently feeding a web of protection strip material whereby a suitable length thereof having projecting end portions is positioned upon said former element above and transversely of the path of travel of the trays, a cutter operative to sever said length from the web, a vertically-reciprocative head including spaced depending members in parallel relation to said cutter and operative in the initial descent of the head, when the former element is in one position to engage the projecting ends of the strip and bend them downward, and in the farther descent of the head, when the former element is in the other position, to depress the said strip and insert its pendant ends between the matches and the adjacent end walls of the tray, and means for actuating said head in timed relation to the former element, the tray feeding means and the strip material feeding means.

23. In a machine for packing matches, the combination with means for feeding filled box trays, of a former element for protection strips overlying the path of said trays, means for reciprocating said element longitudinally of said path to move the element respectively into and from a position directly above a tray, means for intermittently feeding a web of protection strip material whereby a suitable length thereof having projecting end portions is positioned upon said former element above and transversely of the path of travel of the trays, a cutter operative to sever said length from the web, a vertically-reciprocative head including spaced-depending members in parallel relation to said cutter and operative in the initial descent of the head, when the former element is in one position to engage the projecting ends of the strip and bend them downward, and in the farther descent of the head, when the former element is in the other position, to depress the said strip and insert its pendant ends between the matches and the adjacent end walls of the tray, a stripper member interposed between and vertically movable with and independently of said depending members, and means for actuating said head in timed relation to the former element, and the tray and strip feeding means.

24. In a machine for packing matches, the combination with a conveyer for a succession of filled match trays, of a former element for protection strips overlying the path of said trays, said element comprising a former structure having a plurality of former members with open spaces therebetween, means for reciprocating said element longitudinally of said path to move the former members into and from positions directly above a plurality of trays, means for supplying a strip of material with openings spaced a predetermined distance apart to each former member, means for feeding the respective strips to the former members and for engaging said perforations to position the strips, a plurality of vertically-reciprocative heads corresponding with said former members, each head including spaced depending members operative in the initial descent of the head, when the former element is in one position, to engage the opposing ends of the adjacent strips and bend them downward, and then in the farther descent of the head, when the former element is in the other position, to depress the said strip and insert its ends between the matches, and the walls of the adjacent box tray, and means for simultaneously actuating the said heads in timed relation to the former element and the tray conveyer.

25. In a machine for packing matches, the combination with a conveyer for a succession of filled match trays, of a former element for protection strips overlying the path of said trays, said element comprising a frame structure having a plurality of former members with open spaces therebetween, means for reciprocating said element longitudinally of said path to move the former members into and from positions directly above a plurality of trays, means for intermittently feeding a corresponding plurality of webs of protection strip material whereby a suitable length is positioned upon each of said former members above and transversely of the path of travel of the trays, cutters operative to sever the lengths from the respective webs, a corresponding plurality of vertically-reciprocative heads each including spaced depending members in parallel relation to the adjacent cutter and operative in the initial descent of the heads, when the former element is in one position, to engage the projecting ends of the strip lengths supported on the respective former members and bend them downward, and in the farther ascent of the heads, when the former element is in the other position, to depress the said strip and insert its pendant ends between the matches and the end walls of the respective trays, and means for simultaneously actuating said heads in timed relation to the former element and the tray and strip feeding means.

26. In a machine for packing matches, the combination with a conveyer for a succession of filled match trays, of a former element for protection strips overlying the path of said trays, said element comprising a frame structure having a plurality of former members with open spaces therebetween, means for reciprocating said element longitudinally of said path to move the former members into and from positions directly above a plurality of trays, means for intermittently feeding a corresponding plurality of webs of protection strip material whereby a suitable length is positioned upon each of said former members above and transversely of the path of travel of the trays, cutters operative to sever the lengths from the respective webs, a corresponding plurality of vertically-reciprocative heads each including spaced depending members in parallel relation to the adjacent cutter and operative in the initial descent of the heads, when the former element is in one position, to engage the projecting ends of the strip lengths supported on the respective former members and bend them downward, and in the farther ascent of the heads, when the former element is in the other position, to depress the said strip and insert its pendant ends between the matches and the end walls of the respective trays, stripper members interposed between and vertically movable with and independently of the depending members of the respective heads, and means for simultaneously actuating said heads in timed relation to the former element and the tray and strip feeding means.

27. In a machine for packing matches, the combination with a table, of a conveyer for a succession of filled box trays, a conveyer parallel therewith for a succession of tray covers, and means for simultaneously nesting a plurality of filled trays and covers, said means including a plurality of pusher blocks, spaced parallel rack bars for said blocks, a series of gears meshing with said rack bars, a shaft for said gears supported below said table, a fixed frame provided with parallel guides below the respective gears, a series of rack bars slidably fitted in said guides and meshing with the respective gears, means for simultaneously reciprocating said rack bars, vibratory arms mounted on the respective bars and provided with forwardly projecting blades which overhang a plurality of trays, and means for vertically vibrating said arms during their concerted reciprocation, whereby in the forward stroke of the arms they are lowered to permit their blades to drop upon the tops of the respective trays, before the trays are engaged by the pushers, and whereby in the back stroke of the bars they are raised to lift their blades above the path of the trays in the tray conveyer.

28. In a machine for packing matches, the combination of means for advancing a succession of groups of matches in a horizontal path, means for advancing successive box trays across said path in timed relation to the groups of matches, and means for moving a group of matches into each tray at one side of said path and then a second group of matches into each tray at the other side of said path.

29. In a machine for packing matches, the combination of means for advancing a succession of groups of matches in a horizontal path, means for advancing successive box trays across said path in timed relation to the groups of matches, means for moving a group of matches into each tray at one side of said path and then a second group of matches into each tray at the other side of said path, and means for partially turning the trays as they pass from one side of said path to the other.

30. In a machine for packing matches, the combination of means for advancing a succession of groups of matches in a horizontal path, means for advancing successive box trays across said path in timed relation to the groups of matches, means for moving a group of matches into each tray at one side of said path and then a second group of matches into each tray at the other side of said path, and means for settling the matches in said trays on each side of said path.

31. In a machine for packing matches, the combination of means for advancing a succession of segregated groups of matches in a horizontal path, means for advancing successive groups of box trays across the said path of groups of matches in timed relation to the groups of matches, and means for transferring the matches of each segregated group into a group of box trays.

32. In a machine for packing matches, the combination of means for advancing a succession of segregated groups of matches in a horizontal path, means for advancing successive groups of box trays across the said path of groups of matches in timed relation to the groups of matches, and means for first transferring the matches of a segregated group into a group of box trays and then transferring a second group of matches into said group of box trays.

33. In a machine for packing matches, the combination of means for advancing a succession of segregated groups of matches in a horizontal path, means for advancing successive groups of box trays across the said path of groups of matches in timed relation to the groups of matches, means for first transferring the matches of a segregated group into a group of box trays and then transferring a second group of matches into said group of box trays, and means for partially turning the box trays after the transfer of the first group of matches and before transferring the second group.

34. A match machine comprising an endless conveyor having means for supporting successive segregated groups of matches thereon, a second conveyor passing under the first conveyor at right angles thereto, having means to successively pass a number of rows of box trays equal to the number of groups of matches in each segregated group, and means for transferring the different groups of matches of each segregated group into a tray on the conveyor passing thereunder.

35. A match machine comprising an endless conveyor having means for supporting successive segregated groups of matches thereon, a second conveyor passing under the first conveyor at right angles thereto, having means to successively pass a number of rows of box trays equal to the number of groups of matches in each segregated group, and means for transferring the different groups of matches of each segregated group into a tray on the conveyor passing thereunder, a third conveyor in the same horizontal plane as the second conveyor and parallel therewith, and means for transferring the different rows of box trays from the second conveyor to the third conveyor, said means being arranged to pass the box trays of some of the rows across the path of other rows.

Signed at Barberton, in the county of Summit and State of Ohio this 21 day of April, A. D. 1930.

JOSEPH C. DONNELLY.